US008517215B2

(12) United States Patent
Shafir

(10) Patent No.: US 8,517,215 B2
(45) Date of Patent: Aug. 27, 2013

(54) DISPENSING SYSTEM FOR ITEMS

(76) Inventor: Aaron Shafir, Tel Aviv (IL)

( * ) Notice: Subject to any disclaimer, the term of this patent is extended or adjusted under 35 U.S.C. 154(b) by 191 days.

(21) Appl. No.: 13/000,028

(22) PCT Filed: Jun. 18, 2009

(86) PCT No.: PCT/IB2009/052616
§ 371 (c)(1), (2), (4) Date: Dec. 20, 2010

(87) PCT Pub. No.: WO2009/153756
PCT Pub. Date: Dec. 23, 2009

(65) Prior Publication Data
US 2011/0101018 A1 May 5, 2011

Related U.S. Application Data
(60) Provisional application No. 61/085,884, filed on Aug. 4, 2008.

(30) Foreign Application Priority Data
Jun. 19, 2008 (GB) .................................. 0811255.9

(51) Int. Cl.
*B65D 83/00* (2006.01)
*B65G 59/00* (2006.01)

(52) U.S. Cl.
USPC ............. 221/152; 221/151; 221/154; 221/90; 221/124; 221/131

(58) Field of Classification Search
USPC ............. 221/154, 124–125, 129–131, 89–90, 221/151–153
See application file for complete search history.

(56) References Cited

U.S. PATENT DOCUMENTS

| | | | | |
|---|---|---|---|---|
| 2,964,370 | A * | 12/1960 | Butler | 312/222 |
| 6,011,999 | A * | 1/2000 | Holmes | 700/231 |
| 6,640,159 | B2 * | 10/2003 | Holmes et al. | 700/244 |
| 7,142,944 | B2 * | 11/2006 | Holmes et al. | 700/237 |
| 7,293,673 | B2 * | 11/2007 | Savage et al. | 221/122 |
| 7,426,425 | B2 * | 9/2008 | Meek et al. | 700/237 |
| 7,657,344 | B2 * | 2/2010 | Holmes et al. | 700/242 |
| 7,909,418 | B2 * | 3/2011 | McFarland | 312/215 |
| 8,090,473 | B2 * | 1/2012 | Higham | 700/242 |

(Continued)

FOREIGN PATENT DOCUMENTS

GB 0811255.9 12/2009

OTHER PUBLICATIONS

U.S. Appl. No. 61/085,884, filed Jun. 19, 2008, Shafir Aaron.

*Primary Examiner* — Michael K Collins

(57) ABSTRACT

A cabinet for storing and dispensing an inventory of items, the cabinet comprising: at least one drawer having a plurality of criss-crossing row slats and column slats arranged along its bottom and a plurality of corresponding bins. The row slats have a plurality of flexible appendages and the column slats have a plurality of notches corresponding to the appendages. Slat movement actuators axial move the slats. Each bin has a pivotal lid; a lid lock and release element and a lid lock and release element adapted to hold the lid closed until actuated by one of the appendages, whereby bins of various sizes can be arranged abutting each other in the drawer and the bins are openable by actuating the row slat(s) and column slat(s) related to the bins to be accessed.

16 Claims, 29 Drawing Sheets

(56) References Cited

U.S. PATENT DOCUMENTS 8,165,929 B2 * 4/2012 Chudy et al. .................... 705/28
8,234,008 B2 * 7/2012 Weber ........................... 700/242
2004/0111179 A1 6/2004 Broadfield et al.
2009/0187274 A1 * 7/2009 Higham ........................ 700/237

* cited by examiner

DISPENSING SYSTEM FOR ITEMS

CROSS-REFERENCE TO RELATED PATENT APPLICATIONS

This application claims priority from patent application GB 0811255.9, entitled "Dispensing system for items", filed on Aug. 4, 2008; and from provisional patent application U.S. Pat. No. 61/085,884, entitled "Dispensing system for items", filed on Jun. 19, 2008. This application is a national stage entry stage PCT/IB2009/052616, entitled "Dispensing system for items", filed on Jun. 18, 2009.

FIELD OF THE INVENTION

The present invention relates to a dispensing system for items, more specifically to a dispensing cabinet system having drawers accommodating a plurality of bins and a drawer therefor.

BACKGROUND OF THE INVENTION

A dispensing cabinet usually includes a plurality of drawers, each accommodating a plurality of bins. Each bin typically contains one or more items such as medicines, tools, office supplies or the like. Some dispensing systems further include a computer which controls the opening and closing of the drawers and bins thereby providing access to a specific bin only.

U.S. Pat. No. 2004/108795 (Meek) discloses an automatic dispensing system having a plurality of bins. Each bin has a lid controlled by a lock assembly and each lock assembly includes a solenoid or other such actuation means for moving a catch of the lock assembly into an appropriate open/closed position.

EP 1701313 (Cardinal) discloses receptacle having an electronic actuated latch for the top opening that opens upon receipt of required information to be inputted by an operator. The latch affords a safety solution for the receptacle through the entire process of medication distribution, that an unauthorized person cannot gain access to the receptacle other than by vandalizing the receptacle. The receptacle may be adapted to reside in an automated dispensing machine along with a plurality of other like receptacles.

WO 2007/029236 Oscar Ltd.) discloses a dispensing system having at least one drawer comprising a plurality of bins each occupying at least one cell of a drawer cell array having M cell columns and N cell rows. The bins are provided with lockable lids and are selectively transferable between bin released and bin locked positions by actuators, wherein the number of actuators is not greater than M.

U.S. Pat. No. 7,142,944 (Holmes) discloses a cabinet with a drawer having a plurality of cassettes arranged therein. Each cassette is individually movable in a direction that is substantially perpendicular to the base. A plurality of locking mechanisms cooperates to inhibit the movement of each of the cassettes. A controller is operable to actuate one or more locking mechanisms to release one of the cassettes for movement. The locking mechanism includes a series of row and column rods that are each actuatable, for example by a solenoid, to affect locking and allow releasing of the cassettes so that the cassettes can be removed from the drawer.

SUMMARY OF THE INVENTION

The present invention relates to a dispensing cabinet system having drawers accommodating a plurality of bins. Each bin is openable via a command from a controller so the bin will open automatically. Row and column strips, typically adjacent the bottom of the drawers are each operated, typically be a solenoid, in order to actuate the opening of the desired bin so that an item can be removed therefrom.

In accordance with embodiments of one aspect of the present invention there is provided a cabinet for storing and dispensing an inventory of items, the cabinet comprising: at least one drawer having a drawer bottom; a plurality of criss-crossing row slats and column slats arranged along the bottom of the at least one drawer, the row slats having a plurality of flexible appendages protruding upward there-from and the column slats having a plurality of notches corresponding to and for engaging the flexible appendages of the row slats; a plurality of slat movement actuators for axially moving respective row and column slats; a plurality of bins arranged corresponding to row slats and column slats in the at least one drawer, each bin having a lid pivotally connected thereto; and a lid lock and release element associated with each bin, the lid lock and release element adapted to hold the lid closed until actuated by one or more of the flexible appendages of the row slats, whereby bins of various sizes can be arranged abutting each other on all sides thereof in the drawer; and the bins are openable by actuating the row slat(s) and column slat(s) related to the bins to be accessed.

In accordance with embodiments of one aspect of the present invention there is provided a drawer assembly for a drawer of an item dispensing cabinet, the drawer assembly comprising: a plurality of criss-crossing row slats and column slats arranged along the bottom of the drawer, the row slats having a plurality of flexible appendages protruding upward there-from and the column slats having a plurality of notches corresponding to and for engaging the flexible appendages of the row slats; a plurality of slat movement actuators for axially moving respective row and column slats; a plurality of bins arranged corresponding to row slats and column slats in the drawer, each bin having a lid pivotally connected thereto; and a lid lock and release element associated with each bin, the lid lock and release element adapted to hold the lid closed until actuated by one or more of the flexible appendages of the row slats, whereby bins of various sizes can be arranged abutting each other in the drawer and the bins are openable by actuating the row slat(s) and column slat(s) related to the bins to be accessed.

In accordance with embodiments of another aspect of the present invention there is provided a method of opening a selected bin out of a set of bins arranged in a two dimensional array and disposed in a cabinet drawer, the method comprising: moving axially a row slat with respect to the selected bin, the row slat comprising at least one flexible appendage protruding upward there-from, until one of the at least one flexible appendages is situated within a notch of a column slat; moving axially the column slat to push the appendage of row slat with respect to the selected bin, thereby actuating a lid lock and release element to allow opening of the selected bin.

BRIEF DESCRIPTION OF THE DRAWINGS

The invention may be understood upon reading of the following detailed description of non-limiting exemplary embodiments thereof, with reference to the following drawings, in which.

The following detailed description of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DESCRIPTION OF EMBODIMENTS OF THE PRESENT INVENTION

Figure 1:
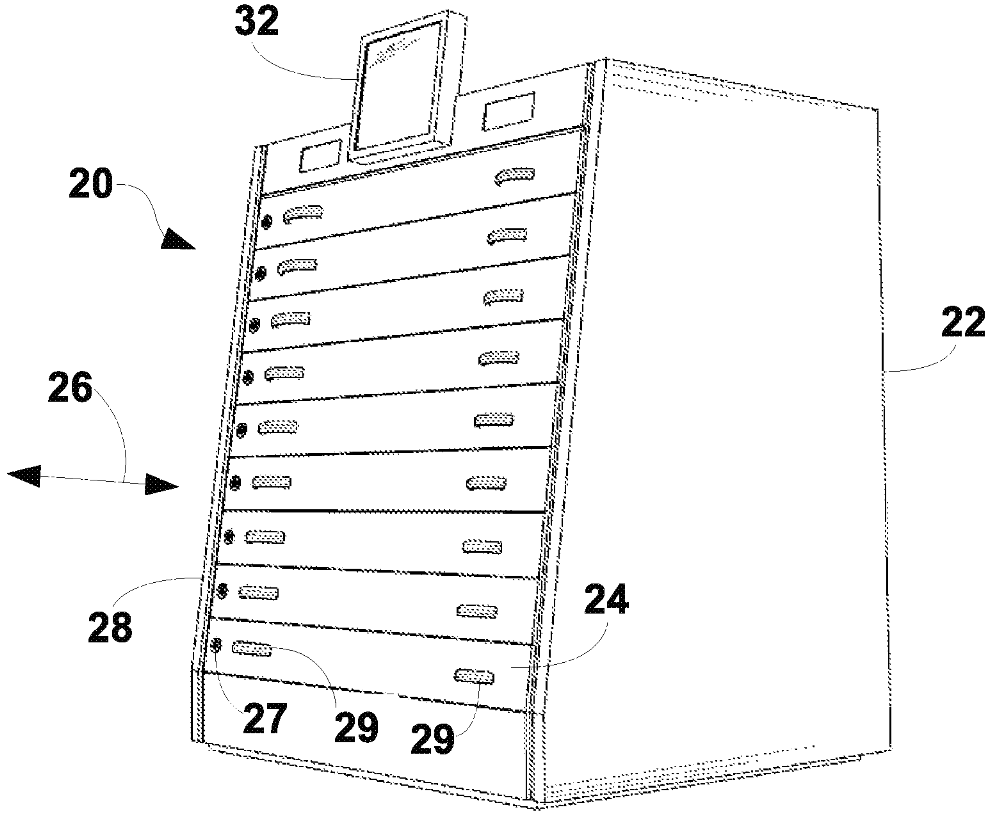
FIG. 1 is an isometric view of a dispensing system in accordance with embodiments of the present invention.
Figure 2:
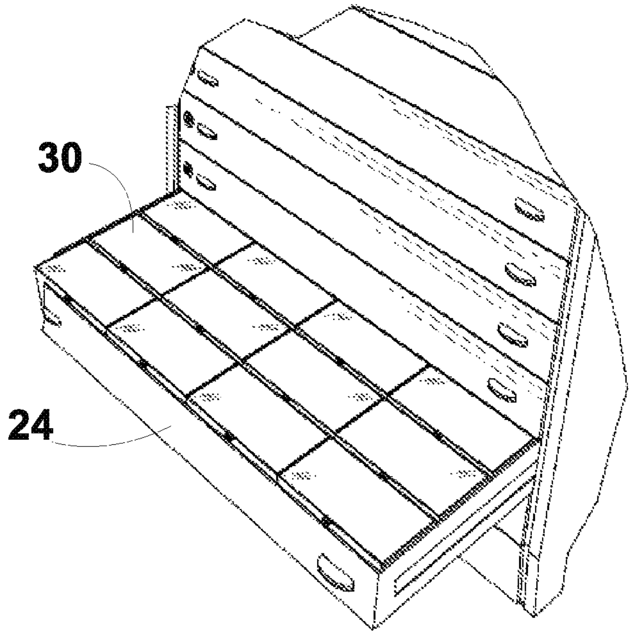
FIG. 2 is an isometric partial view of a dispensing system in accordance with embodiments of the present invention with an open drawer.
Figure 3:
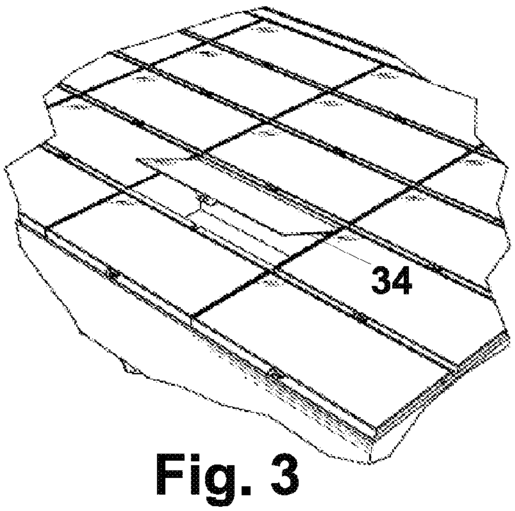
FIG. 3 is an isometric partial view of a drawer accommodating a plurality of bins of the system of the present invention.

FIGS. 1-3 show a dispensing system in accordance with particular embodiments of the present invention. Dispensing system 20 includes a cabinet 22 accommodating a plurality of drawers 24. Each drawer 24 is slidable in-and-out of its respective cabinet 22 along the direction designated by double headed arrow 26, through a cabinet opening formed at a cabinet front face 28.

FIG. 2 shows one of the drawers 24, pulled outward, for storing items in a plurality of bins 30, which are controlled by a drawer access and control system (DACS), not shown. The DACS may include for example, a touch screen display 32, through which a user may issue dispensing or restocking requests, and user identification means such as a card reader or a biometric access control device, so that the DACS can identify the user and determine whether the user is authorized to withdraw or replenish a specific item. Bins 30 are typically made of plastic, wood, metal or a combination thereof.

Reverting to FIG. 1, after the DACS authorizes the withdrawal or the replenishment of a specific item, the user can slide open the specific drawer 24 associated with the specific item to be withdrawn or replenished; or close the drawer. In a preferred embodiment, to indicate drawer opening enablement, a lamp 27, is actuated. The user pulls out drawers 24 with handles 29. When the user pushes the drawer 24 back into position, the drawer is locked (again). In one embodiment, distributing system 20 further includes a bypassing opening system, in case of an emergency situation. A description of such a bypassing opening system is provided herein below in more detail.

Figure 4:
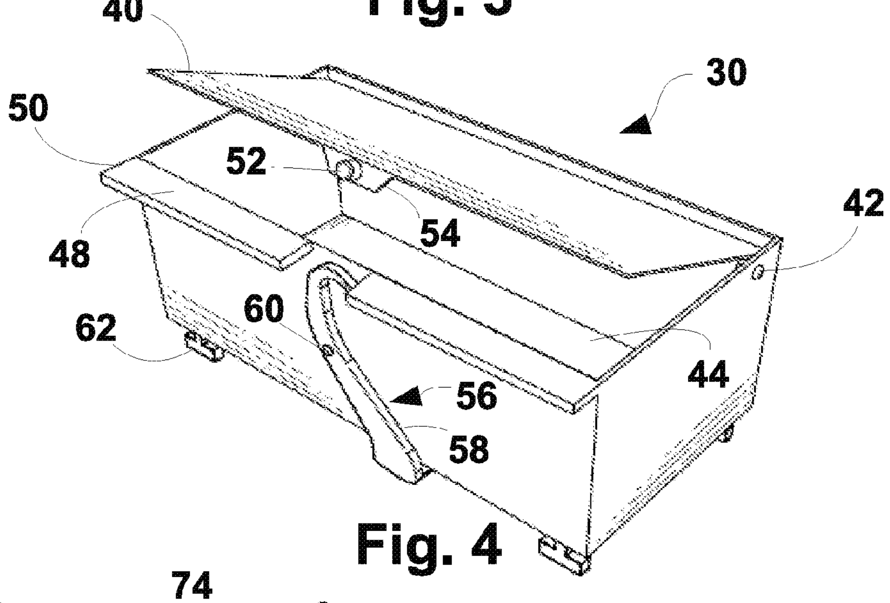
FIG. 4 is an isometric view of an exemplary bin in accordance with embodiments of the present invention.

FIG. 4 shows further details of bin 30 for example a hinge 42 and a biasing-spring, not shown, positioned near the rear of the bin. The biasing-spring urges lid 40 towards an open position, thereby providing access to the space within a compartment 44 of bin 30. When lid 40 is closed, its front edge aligns and engages with a top face 48 of a flap 50. A cylindrical protruding element 52 extends from a perpendicular projection 54 disposed near the front edge of lid 40. A locking assembly 56 is used for locking lid 40 when in the lid is in a closed position. In its closed position, lid 40 covers bin 30 preventing access thereto. In its opened position, lid 40 swivels away from bin 30 to allow access thereto. Locking assembly 56 includes a pivotable latch member 58 and a biasing means such as a biasing spring (not shown). The biasing means is typically positioned around a hinge 60 and the latch member 58 is also rotatable around this hinge. The biasing means urges latch member 58 towards a locking position. Attached to the underside of each bin 30 are one or more catches 62, whose functionality will described below.

Figure 5:
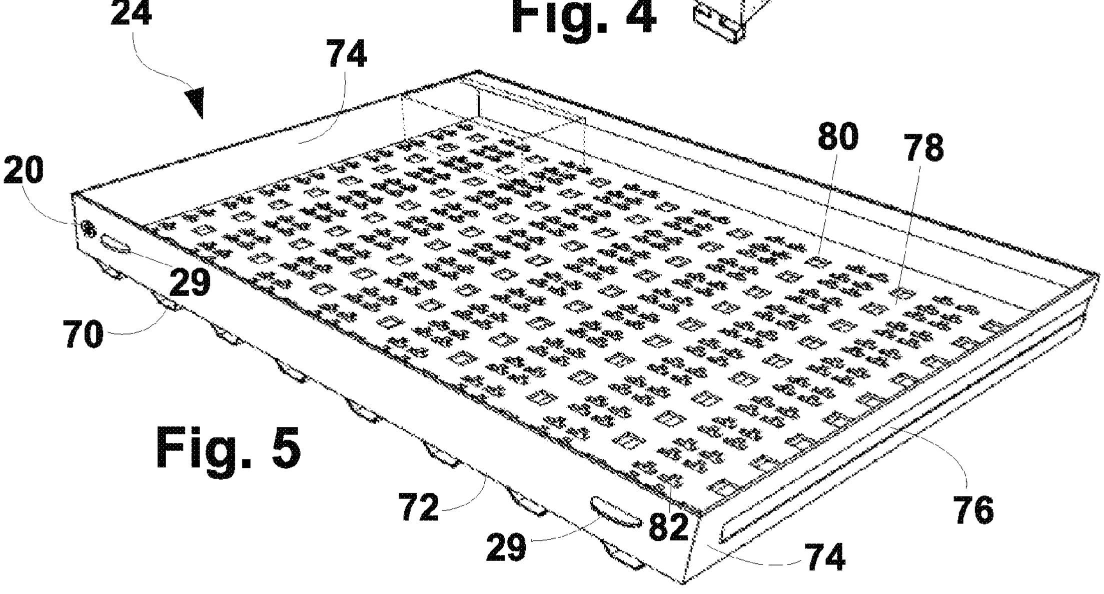
FIG. 5 is an isometric view of a drawer in accordance with embodiments of the present invention.

FIG. 5 shows drawer 24 further including one or more trapezoidal profile elements 70 attached underneath a bottom face 78 of the drawer. Profile elements 70 are disposed in parallel to the drawer's sidewalls 74 and distributed evenly. Along sidewalls 74 are attached stationary rails 76. The drawer's bottom face 78 has plurality of square shaped apertures 80 and a plurality of T-shaped apertures 64. The T-shaped apertures 64 are arranged in pairs, which are arranged in columns. The role of T-shaped apertures 64 will be described next and the role of the squared shape apertures 80 will be described later on in more detail.

Figure 6A:
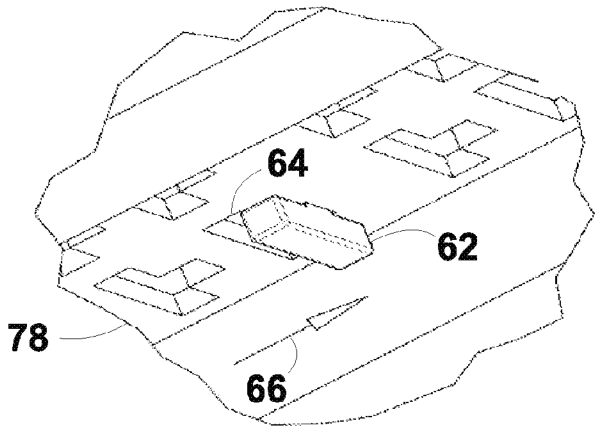
FIG. 6A is an enlarged view of a portion of a drawer bottom surface of embodiments of the present invention.
Figure 6B:
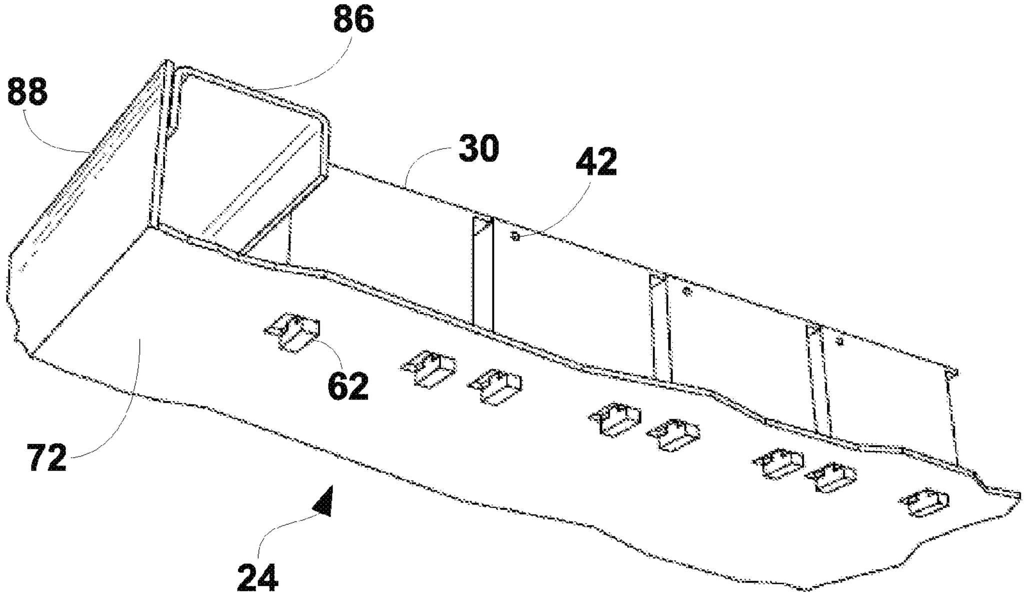
FIG. 6B is an isometric partial view of a drawer as seen from below, showing bins and a support profile, in accordance with embodiments of the present invention.

An enlarged partial sectional view for illustrating how the bins 30 are attached to the base of the drawer 24 is shown in FIGS. 6A-6B. In order to attach bin 30 to the drawer's bottom face 78, one or more catches 62 of the bin are each inserted in their corresponding T-shape apertures 64 by pushing the bin first downwards towards drawer bottom 78. Then, in order to attach bin 30 firmly to the drawer base, the bin and the associated catches 62 are pushed in the direction designated by arrow 66. Referring to FIG. 6B, after assembling all the bins 30 on drawer 24, a U-shaped supporting profile 86 is positioned in the gap left between rear side-wall 88 of drawer 24 and rear exterior face of row of bins 30 which are closest to the rear part of the drawer. The purpose of the U-shaped supporter 86 is to prevent bins 30 from being released by drawer 24.

With reference to FIGS. 7-12, locking assembly 56 further includes one or more shafts 90 having in its front end axially and laterally lingulate projection 92 affixed thereto. The rear portion, not shown, of each shaft 90 is connected to an actuator 94. Preferably, the actuators 94 are electromechanically operated, e.g. via solenoids, and are individually fed instructions and or power by the DACS. Shaft 90 is rotated by actuator 94. Shaft 90 is disposed within the volume created between the upper face of the lower portion of profile elements 70 and the bottom face of bin 30.

Figure 7:
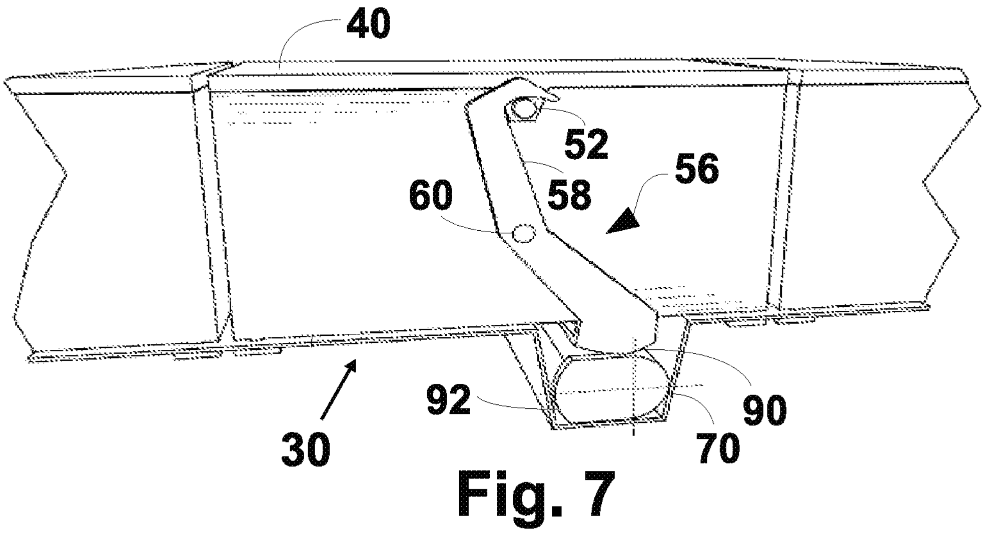
FIG. 7 is partial view of a drawer with a closed and a locked bin.
Figure 8:
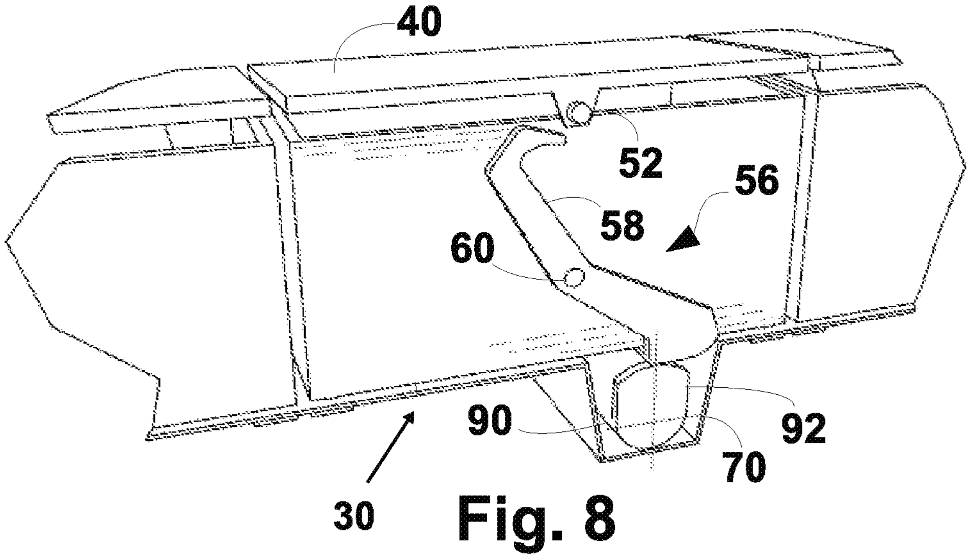
FIG. 8 is partial view of a drawer showing a bin with a partially open lid.
Figure 9:
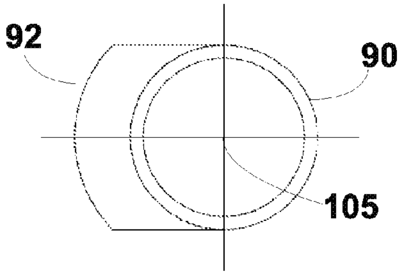
FIGS. 9 and 10 are front views of positions of a shaft projection when the lid of a bin is closed/locked; and open, respectively.
Figure 10:
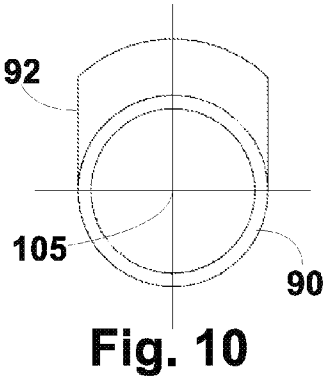
Figure 11:
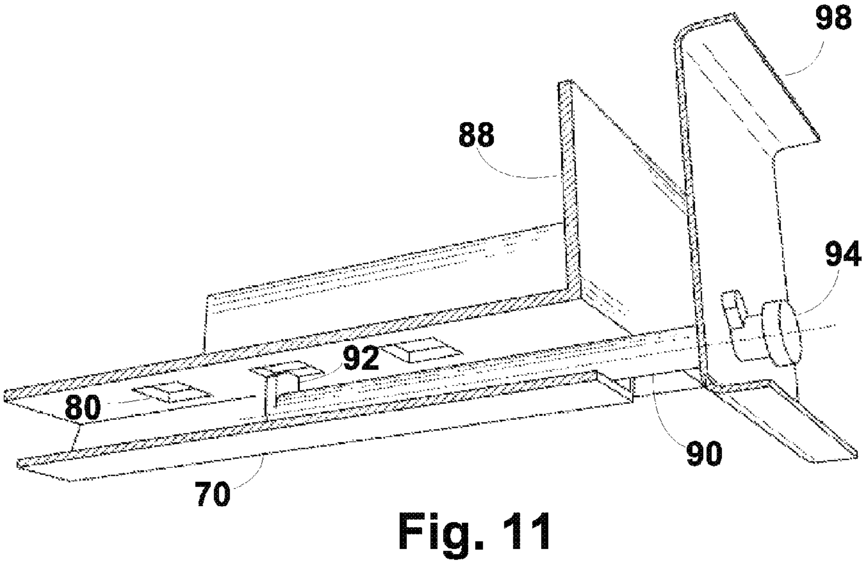
FIG. 11 is an isometric partial view of a cabinet.

Referring to FIG. 7, FIG. 9 and FIGS. 11-12, when lid 40 is closed and bin 30 is locked, actuator 94 attached to shaft 90 is not activated and lingulate projection 92 is positioned as shown in FIG. 7 and FIG. 9. Referring to FIG. 8, FIG. 10 and FIGS. 11-12, in order to open lid 40 of bin 30, first the DACS authorizes the opening of a specific drawer 24 and a specific lid of a respective bin. The user can then pull out the drawer 24 to the fully opened position.

Figure 12:
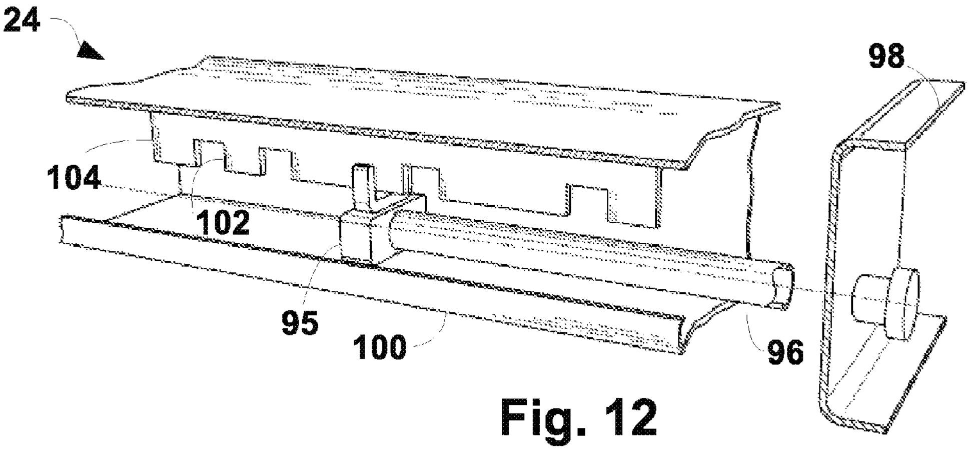
FIG. 12 is an isometric partial view of the cabinet illustrating a sensing mechanism.

Referring to FIG. 12, when drawer 24 is pulled out by the user, a sensor 95 attached to the front end of a shaft 96, senses the portion of the drawer 24 having been pulled out by the user. The rear portion of shaft 96 is attached to a U-shaped profile 98, typically made of metal, plastic, wood or any combination thereof. U-shaped profile 98 is attached transversely to the rear portion of cabinet 22. Housing means 100 is attached underneath drawer 24 and accommodates shaft 96. The length of shaft 96 as well as the length of housing means 100 are approximately the same as the length of drawer sidewalls. Preferably, sensor 95 is of the electro-optical type. Sensor 95 counts the number of apertures such as aperture 102 disposed on cogged board 104. The cogged board is attached underneath bottom face 78 of drawer 24 and extends along the sidewall of the drawer 24. The output signals of the sensor are sent electrically to DACS which processes the data to identify when the row of the desired bin 30 has been pulled out of cabinet 22 by the user. Referring again to FIG. 10, after the selected bin 30 is exposed to the outside of cabinet 22, the DACS commands actuator 94 of bin 30 to rotate shaft 90 around main axis 105 to a limited degree to the position as shown. As a result of the rotation, a force opposing the bias of the spring is created by the impact of lingulate projection 92 on latch member 58 causing latch member 58 to release from pin 52 whereby lid 40 may be opened.

Referring to FIG. 7 and FIG. 9 again, in order to close and lock bin 30, the user pushes the drawer 24 towards cabinet 22, and consequently, lid 40 is closed. Then, the DACS commands actuator of shaft 90 to rotate around main axis 105 to the position as. Consequently, the biased spring attached to hinge 60 urges latch member 58 towards pin 52 and lid of bin 30 gets locked.

Figure 13:
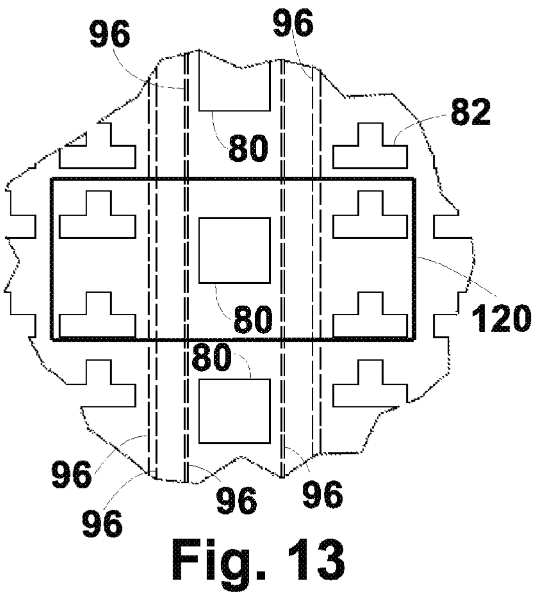
FIGS. 13 and 14 are partial views of drawer bottom face in embodiments of the present invention.

FIG. 13 shows a partial top view of a drawer bottom face 78. Apertures 80 are distributed successively in columns parallel to drawer sidewalls (not seen). Trapezoidal profile element 70 is disposed under each column of apertures 80 designated by dashed lines 96. Referring also to FIG. 7, the purpose of apertures 80 is to have access for interaction between bottom portion of latch member 58 and lingulate projection 92.

Figure 14:
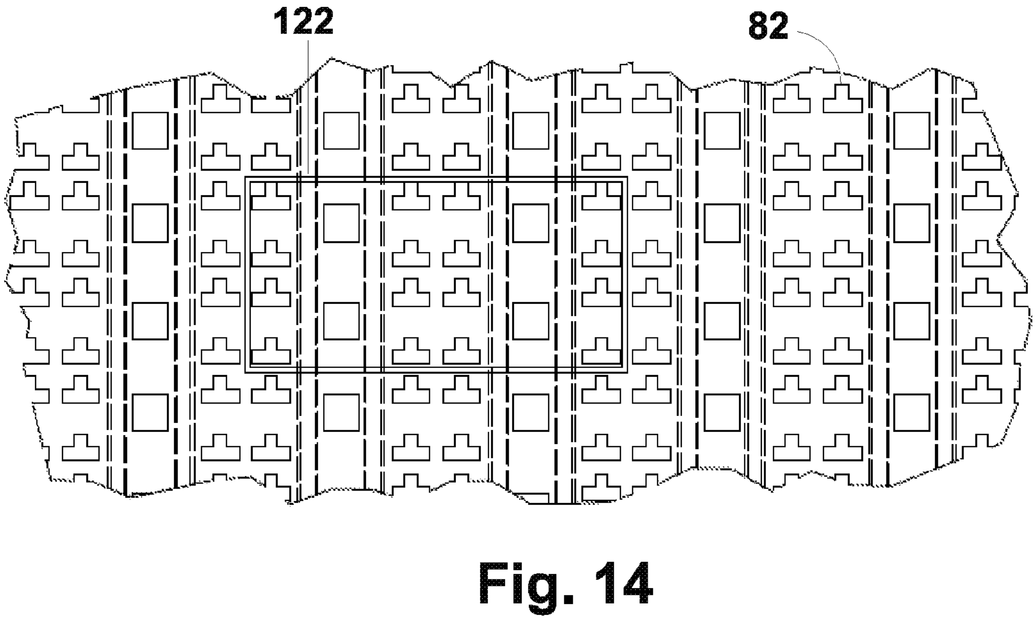

Referring to FIGS. 13-14, in some embodiments of the present invention bins 30 can be implemented in different sizes, a small bin shown in FIG. 13 and a larger bin shown in FIG. 14. A schematic top view of bin 30 with a small size is designated by square 120. Other bin sizes having dimensions forming multiples of square 120 can be suited to drawer base, for example, a bin size four times larger than bin 120 as illustrated a square 122.

Figure 15:
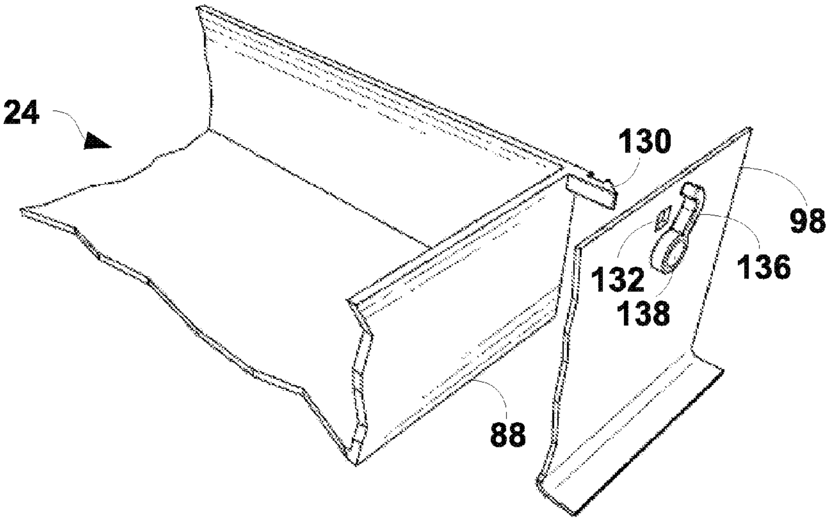
FIG. 15 is an isometric partial view showing the locking mechanism of a drawer.

FIG. 15 shows a locking mechanism of drawer 24 in accordance with the invention. From rear side-wall 88 of drawer 24, a tooth 130 extends outwardly reaching towards an aperture 132. To the surface of U-shaped profile 98, is further attached a locking mechanism such as hooking element 136 for rotating the hooking element to a certain limit. Hooking element 136 is affixed to an actuator 138. In order to lock drawer 24, the user pushes the drawer fully inward toward cabinet 22, subsequent to which, tooth 130 passes through aperture 132 and hooking element 136 engages with actuator 138, and the drawer becomes locked. In order to unlock drawer 24, the DACS commands actuator 138 to rotate in the reverse direction, to the unlocking position.

Figure 16:
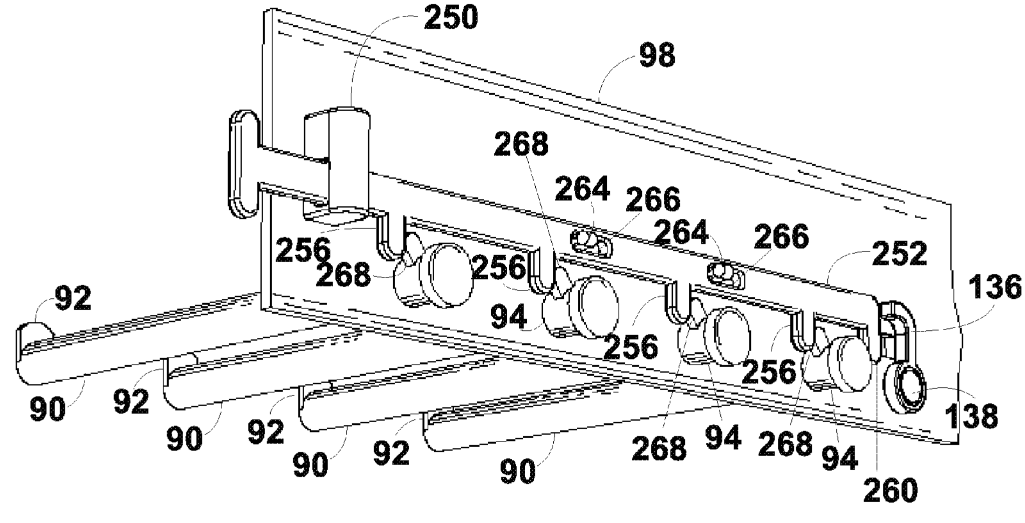
FIG. 16 is an isometric view showing a bypassing opening system operable in an emergency situation in accordance with the present invention.

FIG. 16 shows an isometric view of a bypassing opening system operable in case of an emergency situation in accordance with the present invention. A lock 250 is attached to the outer surface of log 98. Lock 250 is used for locking strip 252 to prevent movement. Extension prongs 256 extend downward from strip 252 and are distributed evenly, engageably facing each actuator 94. An extension prong 260 extends downward at the profile terminal. Protruding elements 264 protrude from the outer surface of log 98 and go through apertures 266. When lock 250 is unlocked, locking strip 252 can move towards hooking element 136 by being pushed. The degree of movement is limited by the freedom of interaction of pins 264 and apertures 266. Referring also to FIG. 15, as a result of the movements of locking strip 252, extension prong 260 engages hooking element 136 and pushes it away from tooth 130, allowing drawer 24 to be opened manually. At the same time, each prong 256 engages the corresponding pin 268 causing shaft 90 to rotate and consequently the line of bin lids are opened. In one embodiment of the present invention a biased spring is attached to strip 252 for biasing it back to the locking position.

Figure 17:
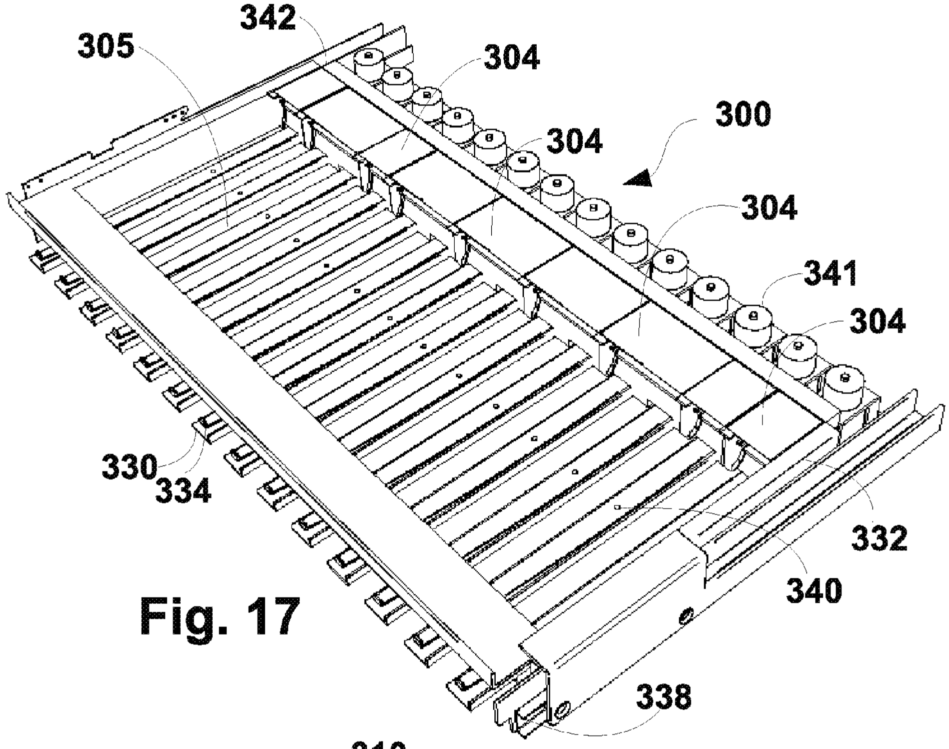
FIG. 17 is an isometric view of a drawer assembly in accordance with embodiments of the invention.
Figure 18:
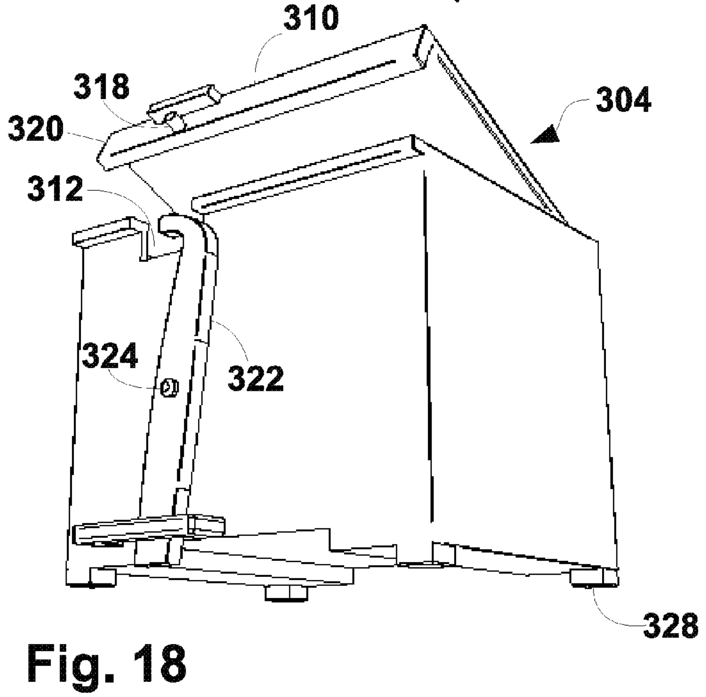
FIG. 18 is an isometric view of a bin with an open lid in accordance with embodiments of the invention.
Figure 19:
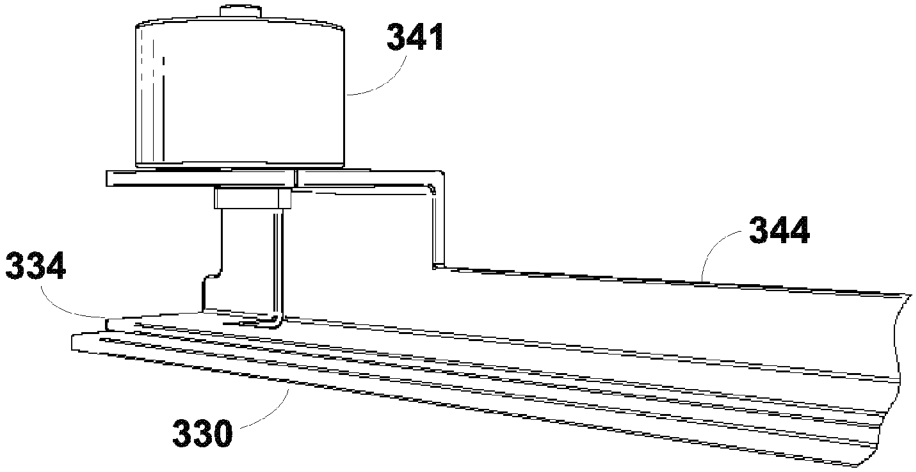
FIG. 19 is an isometric partial sectional view of a shaft and actuator in accordance with embodiments of the invention.
Figure 20:
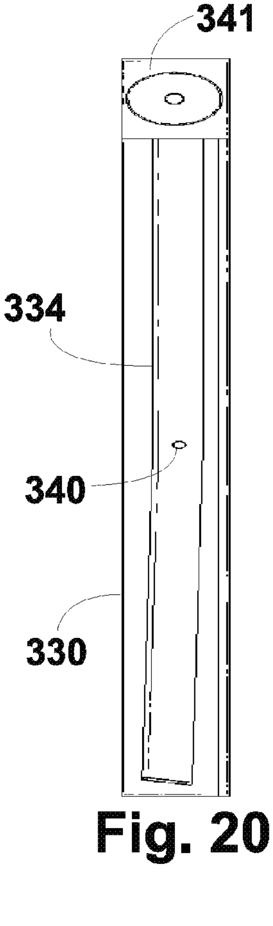
FIG. 20 is a side view of the actuator attached to the shaft in accordance with embodiments of the invention.

FIG. 17 shows an isometric view of a drawer assembly in accordance with an embodiment of the present invention. Drawer 300 stores items in a plurality of bins 304 and the lids of each bin 304 are controlled by the drawer access and control system (DACS), not shown. For the sake of simplicity, only one row of bins 304 is shown attached to the drawer's bottom face 305. Bins 304 are of different sizes. Attention is drawn now also to FIG. 18, showing an isometric view of bin 304 with an open lid 310 in accordance with an embodiment of the present invention. Bin 304 includes a hinge and a biasing-spring (not shown), positioned near the rear of the bin. The biasing-spring urges lid 310 towards the open position, thereby providing access to the space within compartment 312. A cylindrical pin 318 extends from a shelf 320 disposed near the front edge of lid 310. A locking assembly is employed for locking lid 310 when in the lid is closed in which lid 310 covers bin 304 preventing access thereto. In its opened position, lid 310 pivots away from bin 304 to allow access thereto. The locking assembly of each bin 304 includes a latch member 322 and a biasing means such as a biasing spring (not shown). The biasing means is positioned typically around hinge 324 and the latch member is rotatable around hinge 324. The biasing means urges latch member 322 towards the locked position. Attached under the bottom portion of each bin 304 are one or more catches 328 similar to those described in FIG. 4. The drawer assembly further includes one or more profile elements 330 attached on top of drawer bottom face 305. Profile elements 330 are disposed in parallel to the drawer sidewalls 332 and are typically distributed evenly. Shaft 334 is disposed upon profile element 330. Shafts 334 are attached in one end to actuator 341 disposed behind rear side wall 342 of drawer 300. These shafts are rotatable sideways around vertical hinges 340 while a biasing means such as a biasing spring (not shown) is positioned typically around hinge 340. Referring now also to FIG. 19 which shows an isometric partial view of shaft 334 attached to actuator 341 used to rotate shaft 334 around vertical hinge 324 upon the upper face of profile element 330.

Figure 21:
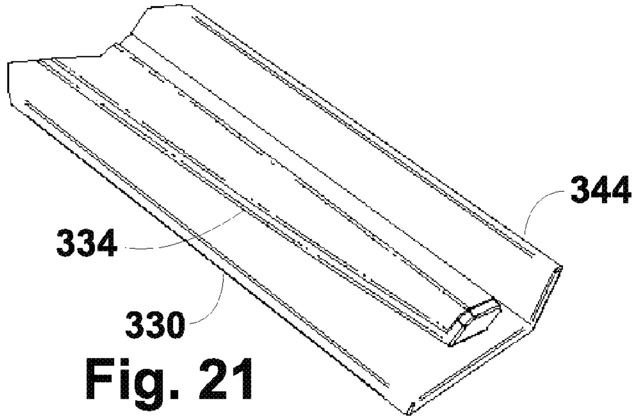
FIGS. 21-22 show isometric partial views of a shaft and a profile element in accordance with embodiments of the present invention.
Figure 22:
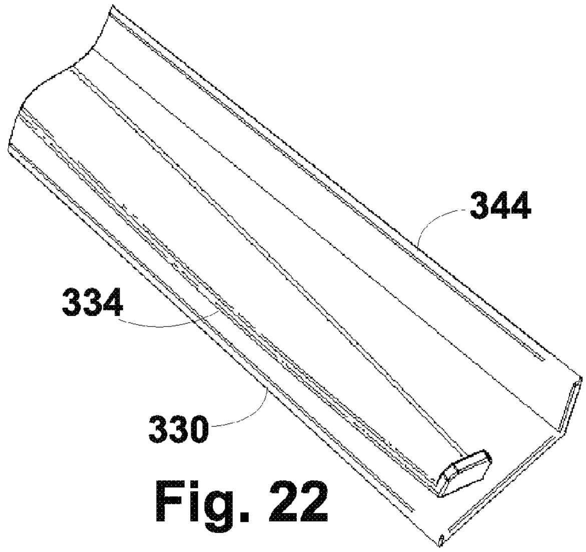
Figure 23:
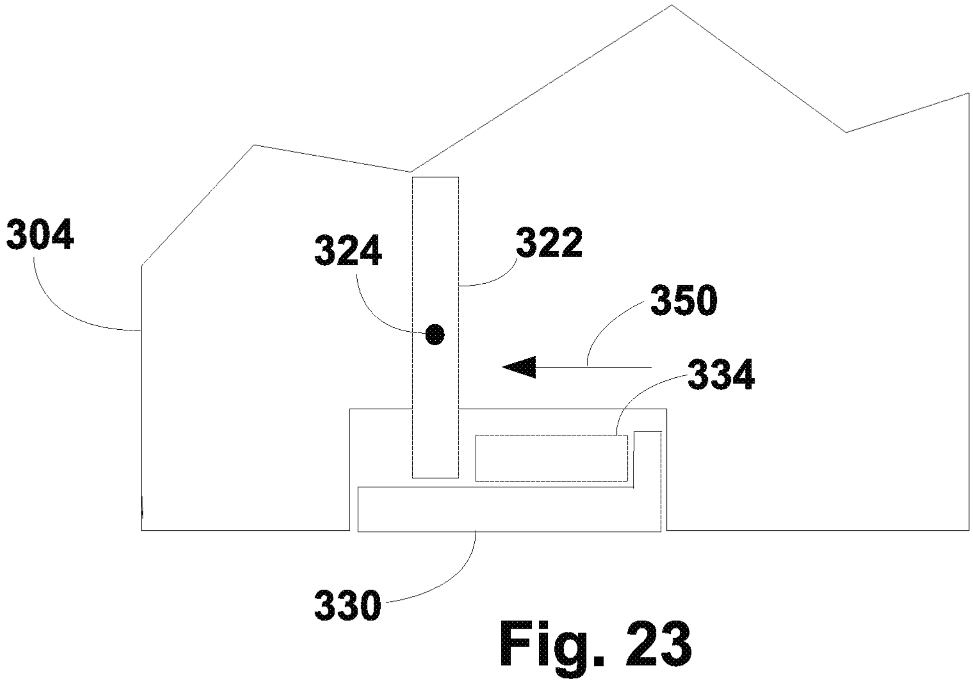
FIGS. 23-24 are schematic partial front views illustrating an exemplary bin lid opening mechanism.
Figure 24:
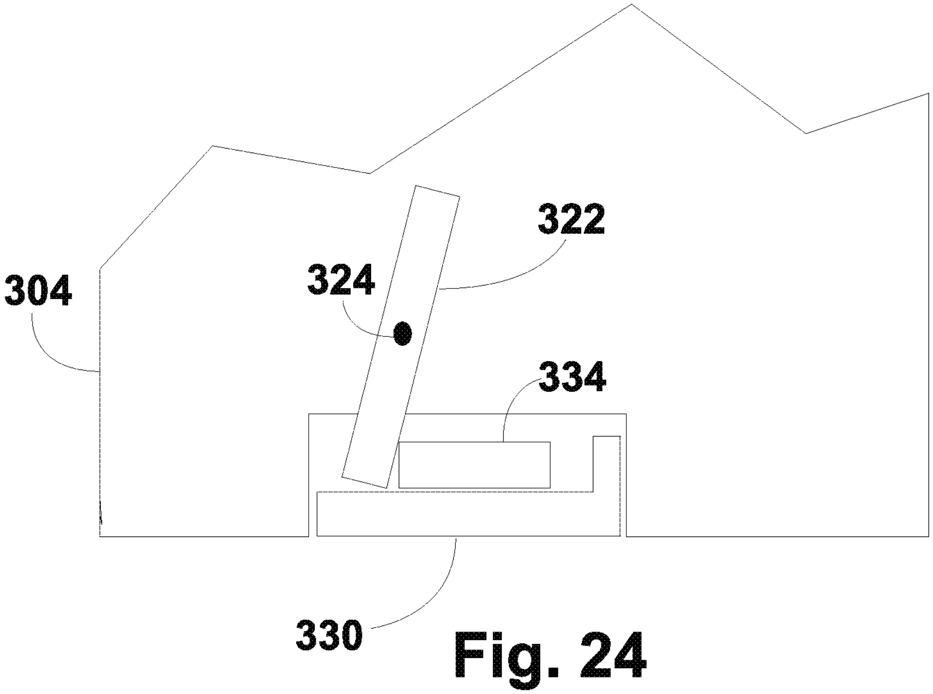

Referring now to FIGS. 21-24, the biasing means (not shown), positioned typically around hinge 340, urges shaft 334 towards sidewall 344 of profile element 330 for example, as shown in FIG. 21. When actuator 341 is activated, shaft 334 rotates sideways to the opposite side of sidewall 344 for example, as shown in FIG. 22. The timing for activating actuator 341 and the way to identify when a row of the desired bin 304 is pulled out of the cabinet 22 as a result of the user pulling drawer 24 is as described above, for example with reference to FIG. 12 and its related description. Attention is drawn now to FIGS. 23-24, showing a schematic partial view of the mechanism for opening a bin's lid 310. In order to open bin 304, an actuator attached to shaft 334, not shown, is activated, forcing the shaft to move in the direction designated by arrow 350 towards the bottom portion of latch member 322. Shaft 334 strikes the bottom portion of latch member 322 urging it to rotate around hinge 324, as shown in FIG. 24, allowing lid 310 of bin 304 to open.

Along sidewalls 332 are attached stationary rails 338. Referring now also to FIG. 13, drawer bottom face 305 has one or more T-shaped apertures for example such as apertures 82 and the functionality of the T-shaped apertures are the same as described with reference to FIG. 6B.

Figures 25A, 25B, 25C:
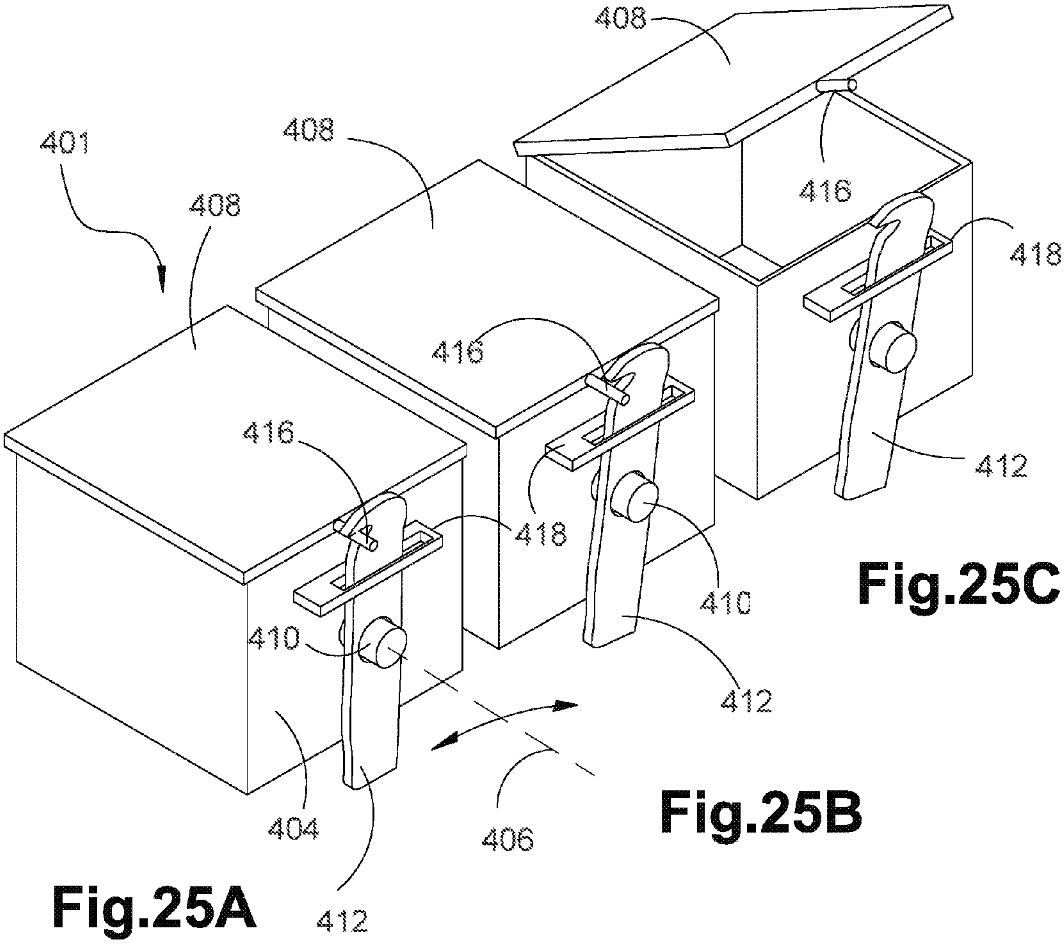
FIGS. 25A-25C are schematic views of a bin in a closed, about to open and opened positions, respectively.

FIGS. 25A-C schematically show an embodiment of a bin 401 in accordance with the present invention. Bin 401 has a swivable lockable lid 408 biased by a spring towards the opened configuration. Bin 401 has a forward looking short pivot shaft 410 attached to a front face 404 of the bin. A locking hook 412 is swivable on shaft 410, in parallel to the front face of bin 401. Shaft 410 forms therefore a pivot as described by axis of rotation 406. A spring biases locking hook 412, urging it in the direction of a locking extension pin 416 of lid 408. As can be seen in FIG. 25B locking hook 412 has turned slightly around pivot 410, almost disengaging from pin 416. In FIG. 25C, locking hook 412 has been completely disengaged from pin 416, as a result of the continued rotation of the hook, and the biasing spring opens lid 408.

Figure 26:
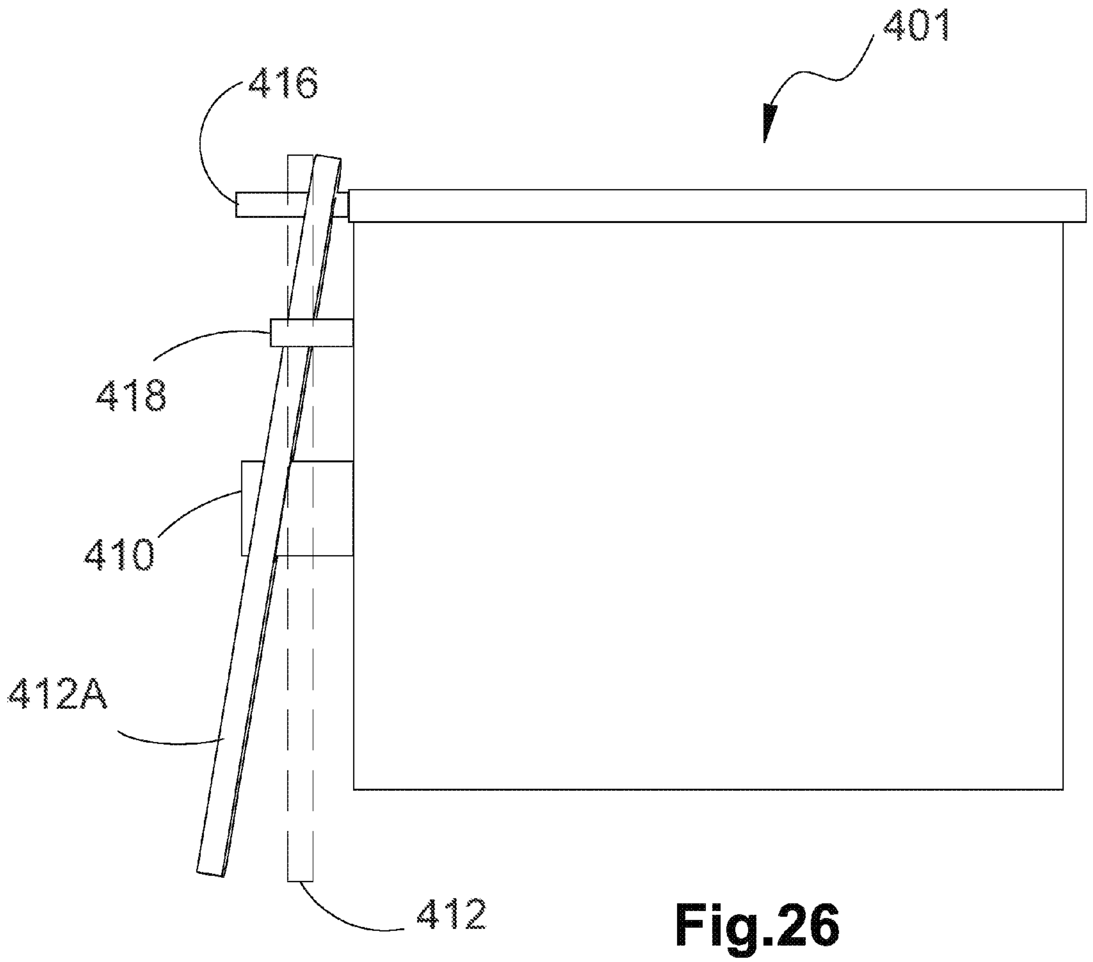
FIG. 26 is a schematic side view of a bin showing a tiltable hook of the bin's opening mechanism.

A shelf 418 at the front of bin 401 contains a slit set in parallel to the front face 404 and constraining locking hook 412, and permitting the hook to swivel substantially only in a plane parallel to the front face of the bin. Yet locking hook 412 is permitted an additional movement. At its bottom end, hook 412 can perform a limited movement towards and away from bin 401 on shaft 410. This movement is illustrated in FIG. 26. Locking hook 412 at its upright position is described by a dashed line; this same locking hook 412 is tiltable, tilting on shaft 410 to assume maximal tilt as indicated by 412A. In both positions of the lock 412 and 412A, pin 416 can be either released or locked. Lock 412 is restrained by the dimensions of the slit of shelf 418.

Figures 27A, 27B:
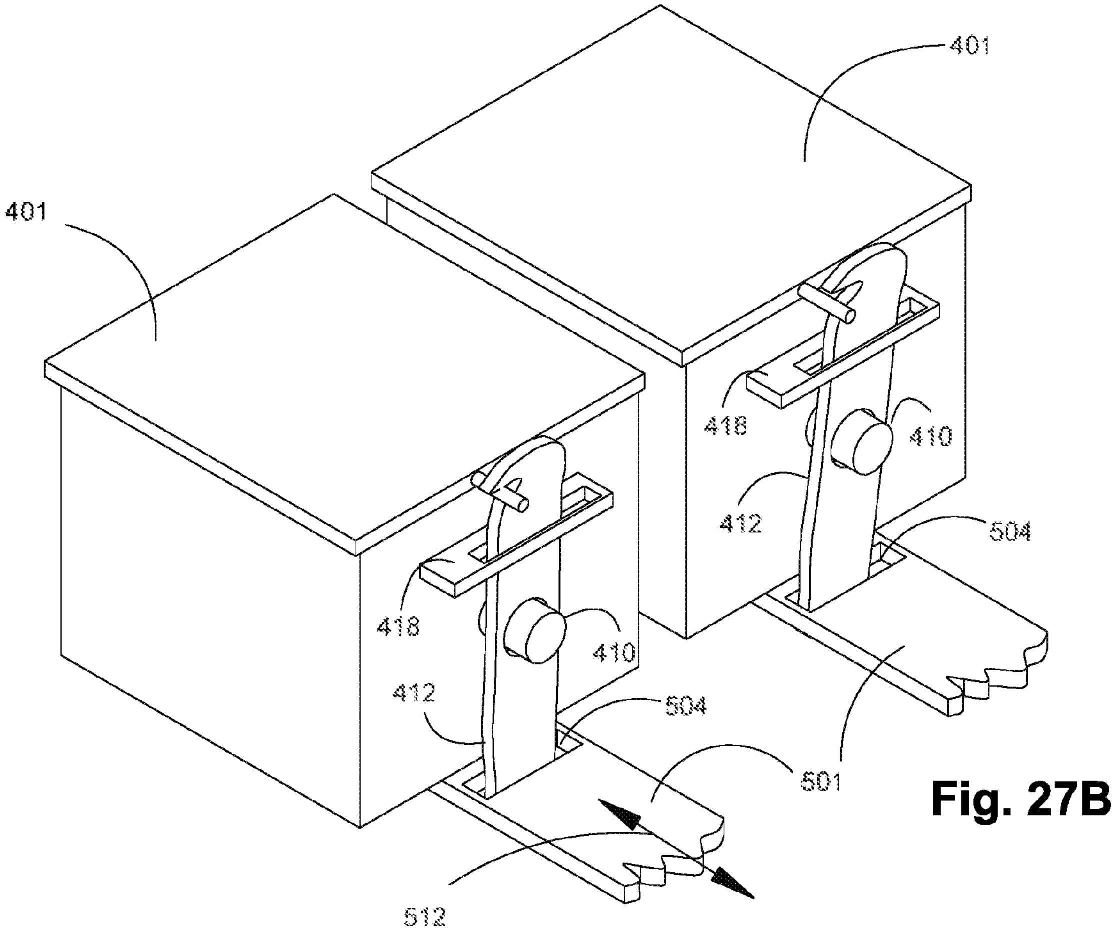
FIGS. 27A-27B is a schematic side view of a bin illustrating a lock tilting mechanism.

FIGS. 27A-27B show a lock tilting mechanism that tilts lock 412 from the upright to the slanted position. This tilting mechanism includes a slat 501 bearing a slit 504. Below bin 401, slats 501 are disposed, lengthwise to the bin, the slats having a main axis. Slats 501 have slits 504 perpendicular to their main axis, disposed typically in regular spacing along the main axis of slat 501. Slits 504 are limited in length at both ends, not traversing slat 501 completely. The function of these and other slats will be explained below.

Figure 28:
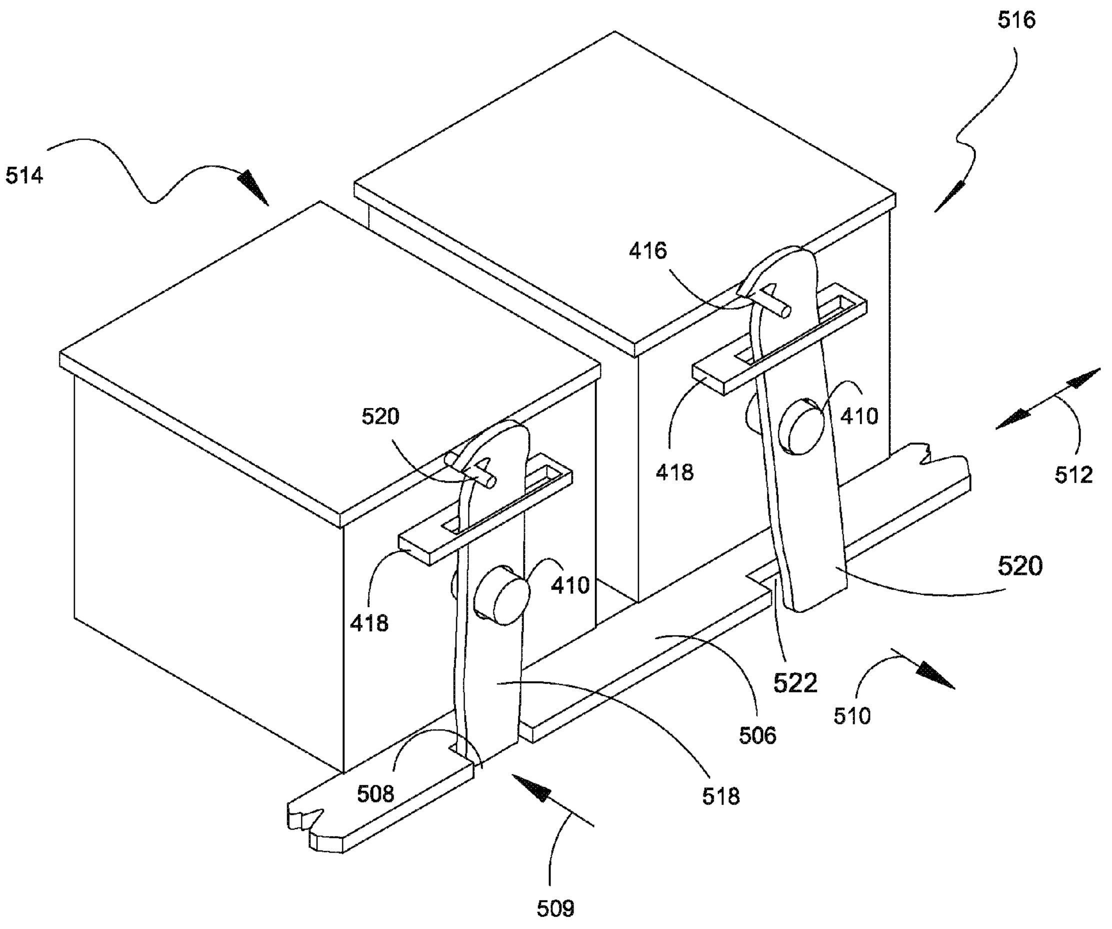
FIG. 28 shows an isometric view of transverse slats that run along the front of a bin engageable with the bottom end of the hook.
Figure 29:
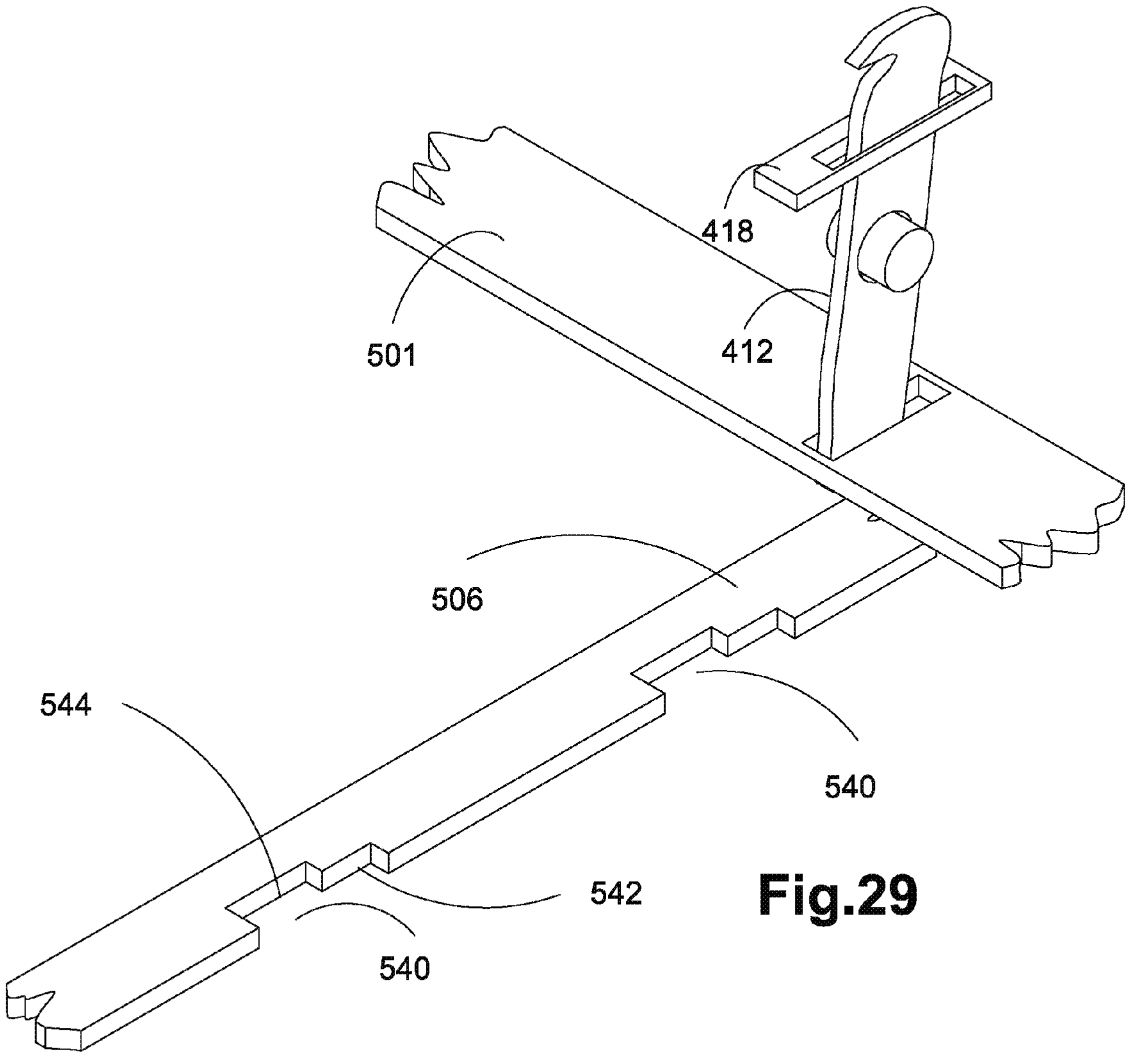
FIG. 29 shows an isometric view of two successive levels at one side of a slat.

FIGS. 28 and 29 show how locking hooks 412 are activated by slats 501 and transverse slats 506, perpendicular to slats 501. Slats 506 typically disposed below slats 501 and run along the front of bin 310 in parallel and below the front face of the bin, and are engageable with the bottom end of hooks 412. Spaced evenly along the length of slats 506 and only at one side of which, are recesses 508, such that an engaged hook 412 (bottom end thereof), can transgress the imaginary boundary, into slat 501.

As seen in FIG. 29, in some embodiments, at one side of slats 506, compound recesses 540 form a two step ingression into the slat at two successive levels, a shallow level 542 and a deep level 544.

As seen in FIG. 27A, slat 501 is movable back and forth along its main axis as indicated by double headed arrow 512. In a fully assembled state, the bottom end of hook 412 protrudes through slit 504 of slat 501, such that a movement of the slat pushes or pulls the hook. The directions are seen in FIG. 28. Pushing in the direction 509 or pulling in the direction 510 the locking hook at its bottom end, respectively. When the hook's bottom end is shifted (by the respective slat) towards transverse slat 506, it becomes engageable by the transverse slat. On the contrary, when slat 501 pulls the bottom end of hook 412 away from slat 506, it becomes unengageable by slat 506.

Each slat curves or is otherwise bent at one side, typically in the upwards direction. The upward inclined portion serves as an anchor for a push-pull arm of an electric actuator, typically a solenoid. The respective solenoid for each shaft is attached to the drawer wall in which the entire set of bins is disposed.

The location of each bin in a drawer is defined by its respective X and Y coordinates. Slats 506 are referred to hereinafter also as X coordinate slats or X slats, since they conform with the X direction (across the drawer) and slats 501 are referred to hereinafter also as Y coordinate slats or Y slats as they conform with the inward/outward movement of the drawer. To describe the opening of a bin 514, movement of Y slat 501 with respect to bin 514 pushes the locking hook 518 (FIG. 28) at its bottom end. When the hook's bottom end is pushed (by the respective Y slat 501) towards transverse X slat 506, the hook becomes engageable by the transverse slat. The movement of X slat 506 while hook 518 is locked in recess 508 can swivel lock 518 away from pin 520 thus, the lid of bin 514 can open. When a Y slat 501 pulls lock 520 away from the respective bin, lock 520 is released from its locked position in a recess 522 and cannot be swiveled by the movement of X slat 506.

Figure 30:
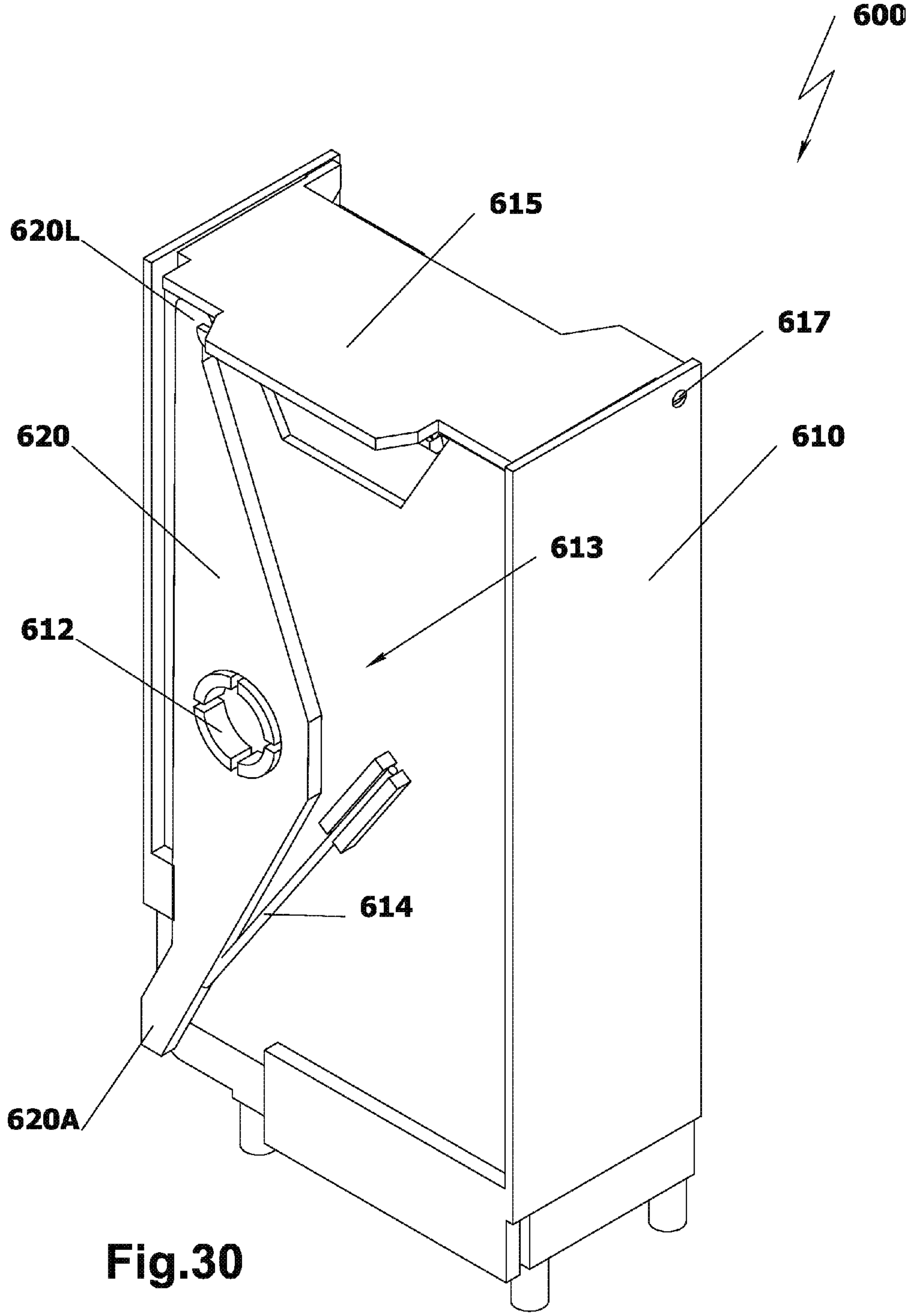
FIGS. 30-33 are isometric views showing a bin assembly of an embodiment of the present invention.
Figure 31:
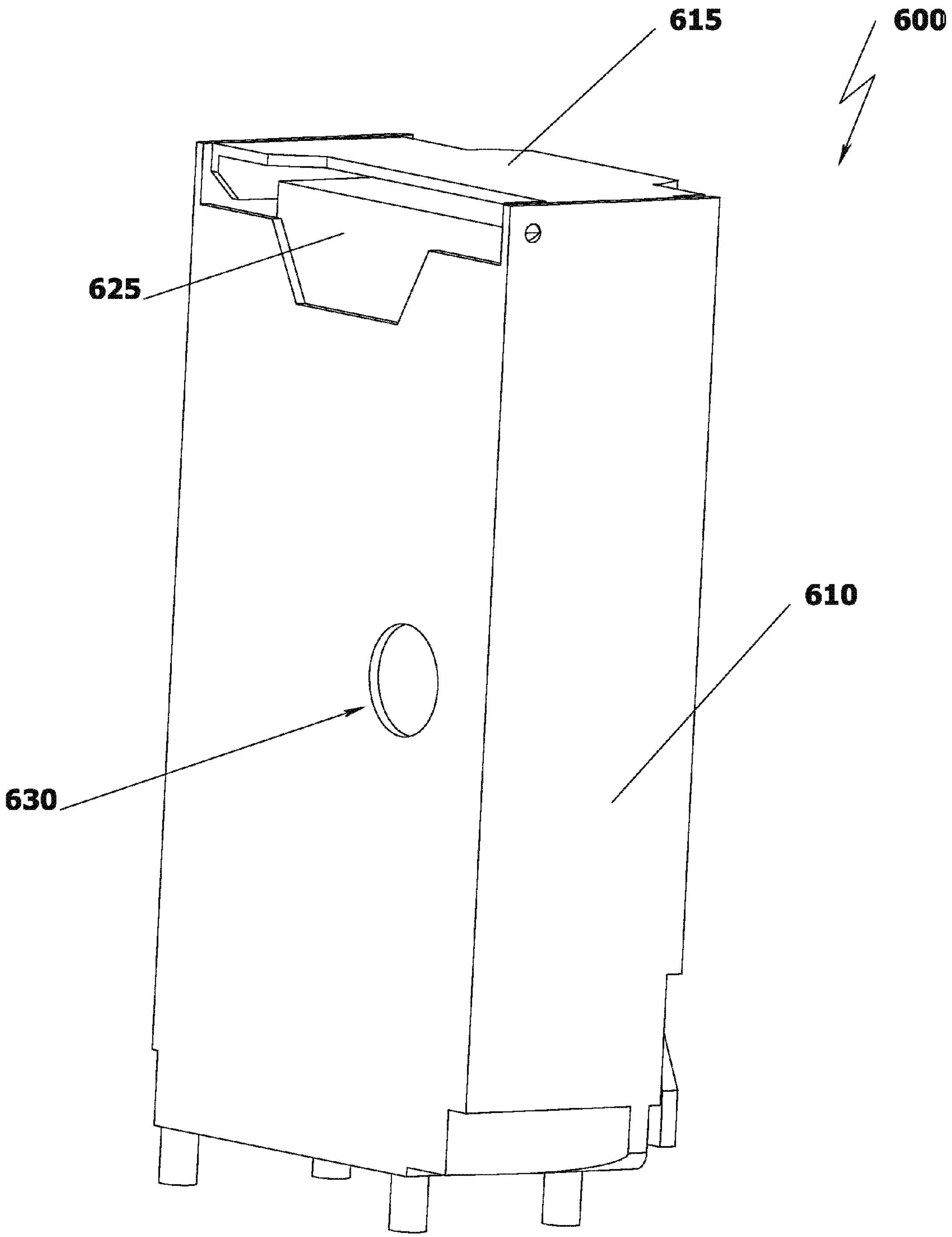
Figure 32:
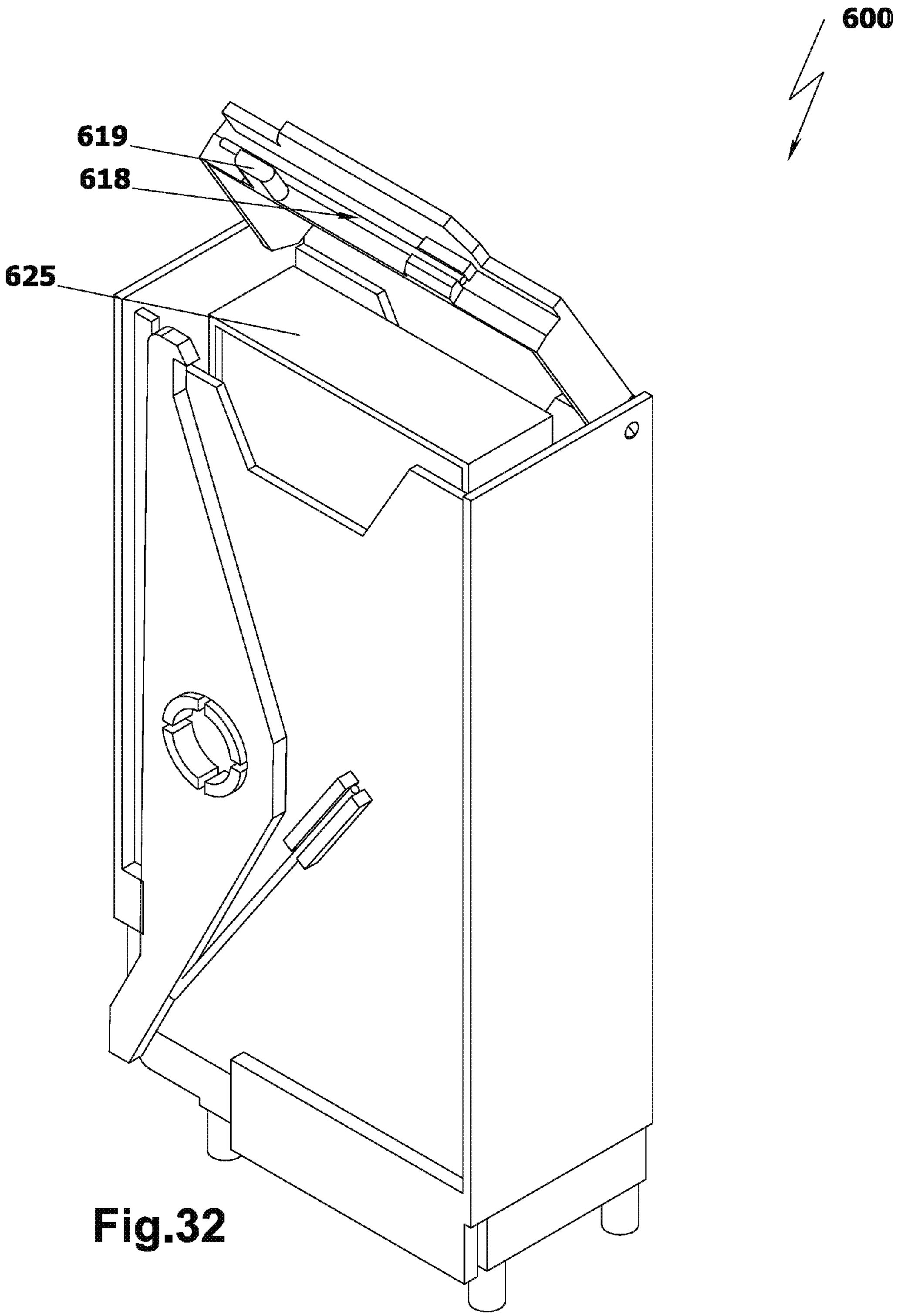

FIGS. 30-32 show a schematic view of a single bin assembly 600 in accordance with embodiments of the present invention. A bin 610 has a swivable lockable lid 615 swiveled around a hinge 617 and biased by a spring 618 towards the opened configuration. Lid 615 has a locking extension pin 619 visible when the lid is opened. Bin 610 has a forward looking short pivot shaft 612 attached to the front face 613 of bin 610. Bin 610 has short cylindrical recess at its hind face 630, matching shaft 612, so that a plurality of bin assemblies 600 can be packed back to front in a working assembly.

Locking hook 620 is swivelable on pivot 612, in a plane parallel to the front face of bin 610. Leaf spring 614 biases locking hook 620, urging it in the direction of pin 619 of lid 615. Locking hook 620 has locking portion 620L at the top and actuating portion 620A at the bottom. In this configuration, locking portion 620L of locking hook 620 engages pin 619 and keeps lid 615 in the closed position. Upon exertion of a force onto actuating portion 620A of locking hook 620, rotating locking hook 620 around pivot 612 against the direction of the bias of spring 614, locking portion 620L of locking hook 620 is urged away from pin 619 of lid 615. Thusly locking hook 620 and pin 619 disengage and biasing spring 618 urges lid 615 to open. Upon the opening of lid 615, bin 625 becomes accessible.

In some embodiments, alternatively or in addition to biasing spring 618, a biasing means (not shown) that urges bin 625 in upward direction can be employed; thereby upon opening lid 615, bin 625 springs upwards, making the contents of bin 615 easily accessible.

Bin 610 has a slot (not shown) at the bottom in parallel to the front face 613, in which transverse slats 506 can pass. The bottom of bin 610 has a slanted face (not shown) which is used to allow the movement of appendages of perpendicularly oriented slats 501 and 506 in order to actuate locking hook 518 of bin assembly 600 open up the lid thereof, as elaborated infra.

Figure 33:
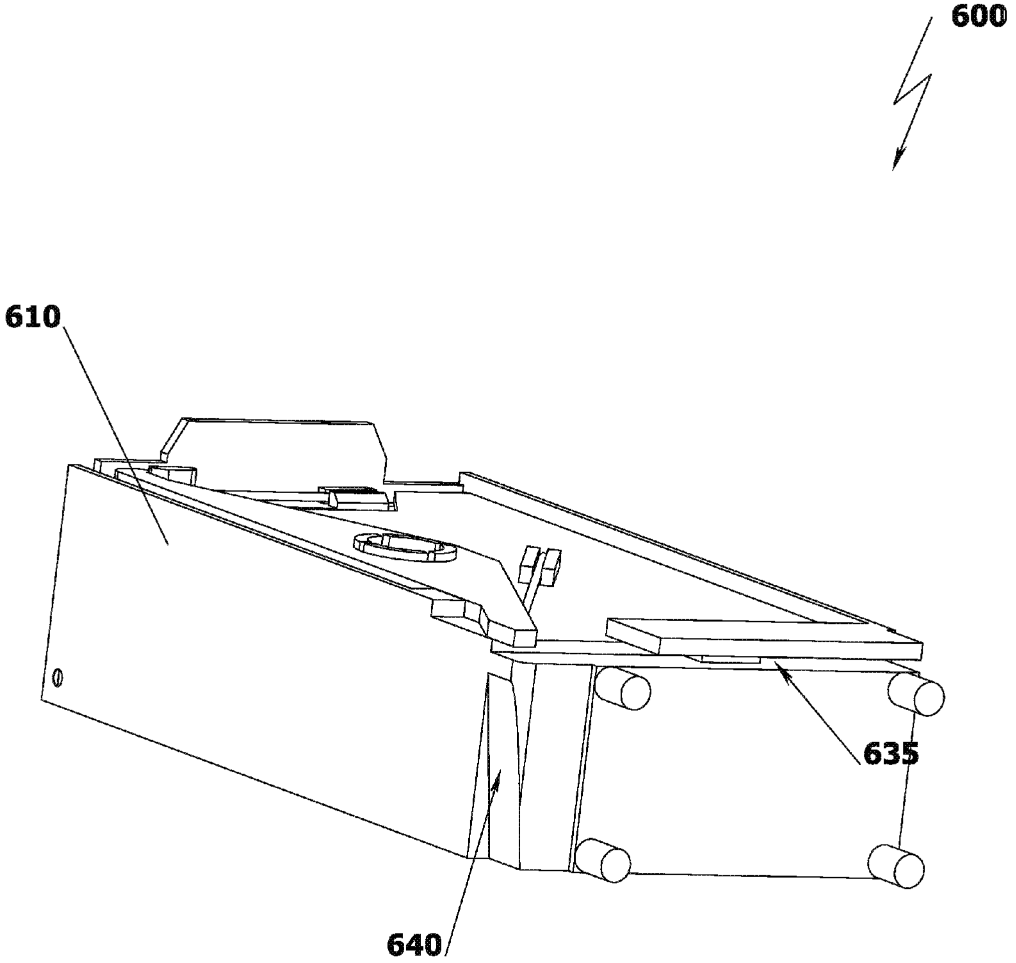

The bottom of bin assembly 600 is shown in FIG. 33. Bin 610 has a slot 635 in which transverse slats 506 are slidably accommodated. Bin 610 further has slanted face portion 640 which is used to direct an upright extension of perpendicular slats 501 and 506 in the form of flexible appendages 715 (FIGS. 34A-B and 35A-B).

Figure 34A:
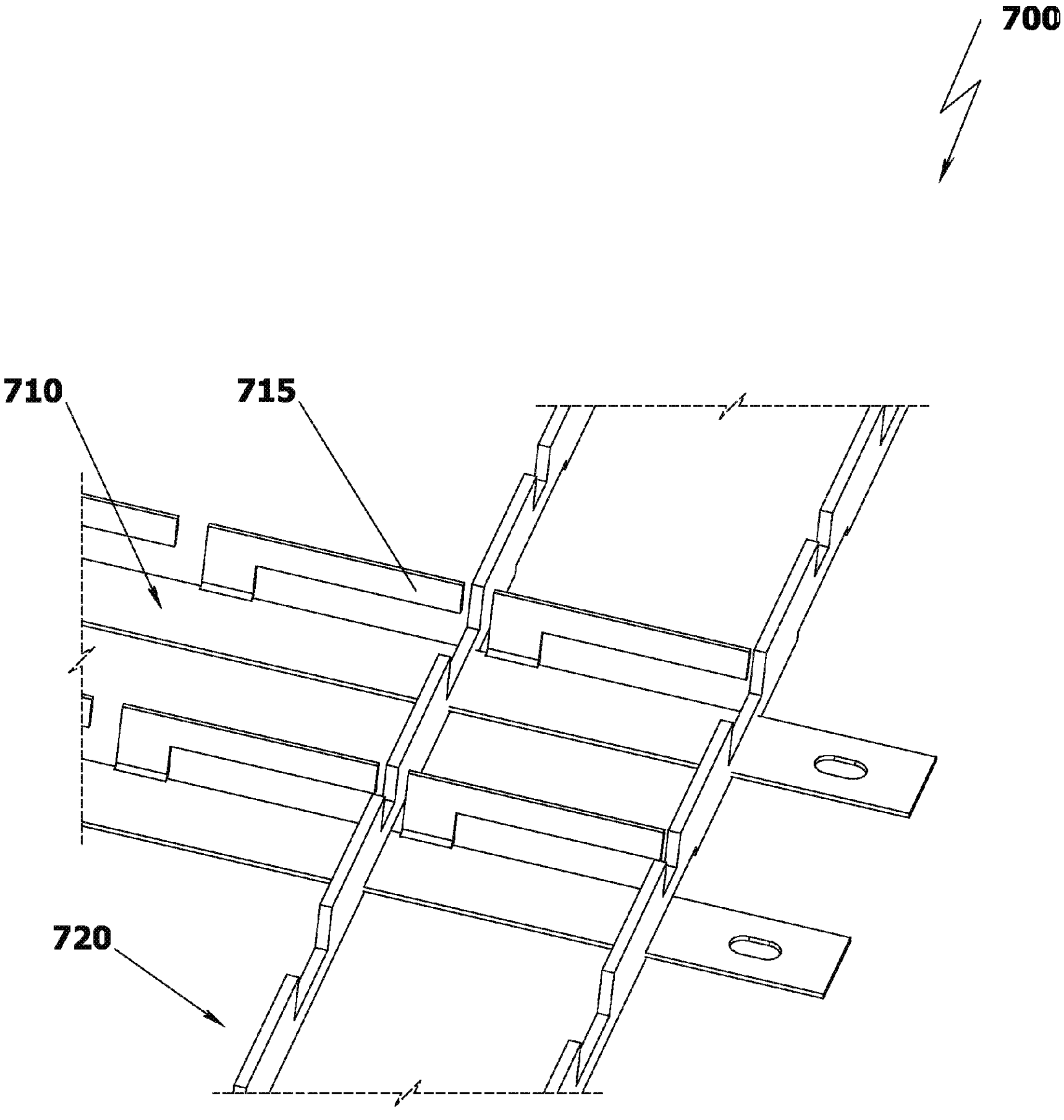
FIGS. 34A-B shows an assembly of transverse and perpendicular slats in accordance with an embodiment of the present invention.
Figure 34B:
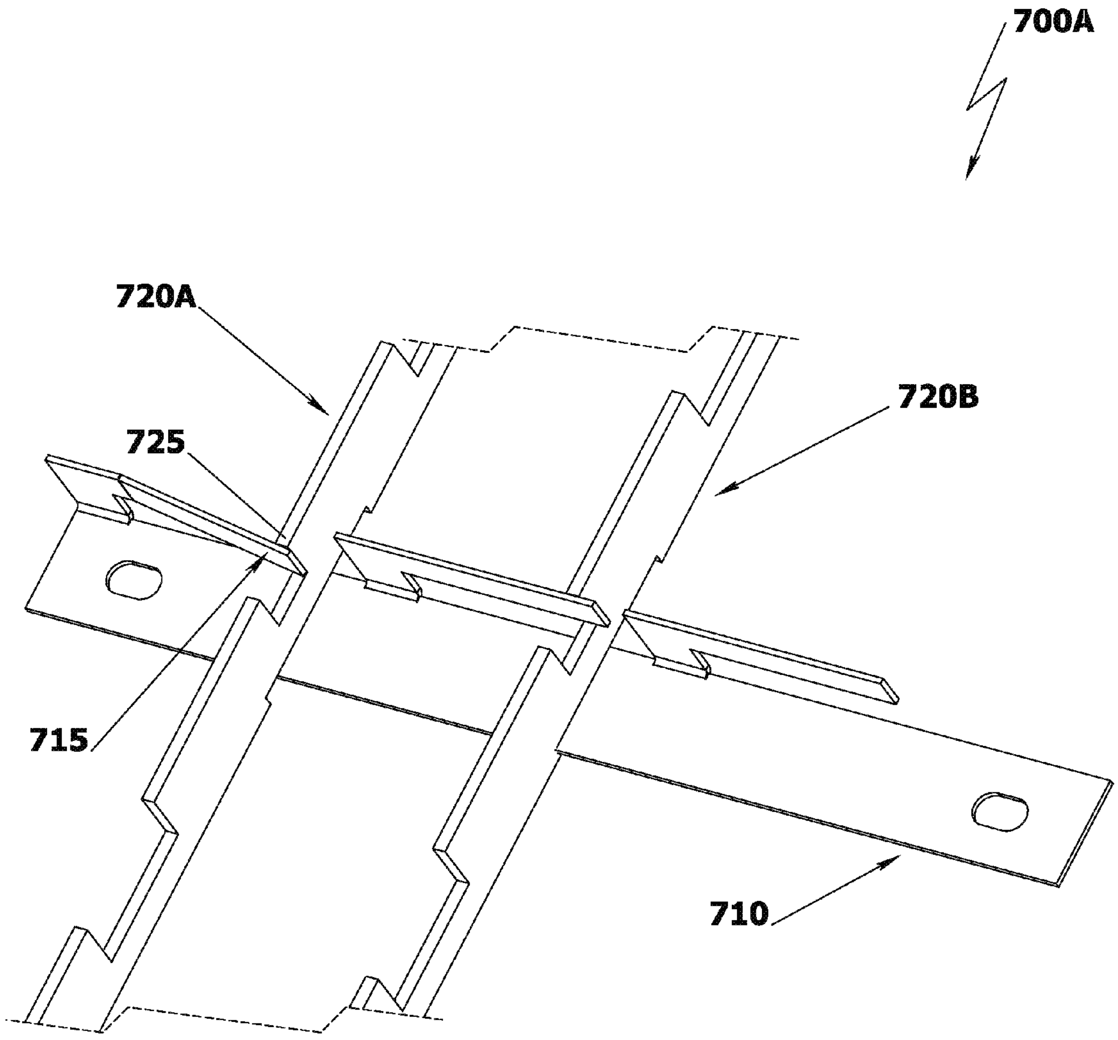

FIGS. 34A-34B show an embodiment of a slat assembly 700 including a Y coordinate slats 710 having appendages 715 and recessed X coordinate slats 720. Y coordinate slats 710 are typically disposed below X coordinate slats 720, which run along the front of the bin, in parallel and within slots 635 at the bottom of the bin assembly. Assembly 700 of slats 710 and 720 controls the opening and closing of a particular bin assembly mounted on assembly 700, as will be explained below.

Slats 710 and 720 are movable along their respective main axes. As can be seen in FIG. 34A, in an assembled state, slats 720 are movable relatively to slats 710 in such a way that appendage 715 thereof is not necessarily affected by the movement of slats 720, and vice versa, slats 710 are movable relatively to slats 720 as appendage 715 can protrude throughout the respective recesses in recessed slats 720.

Reverting to FIGS. 34A-34B, showing assembly 700 of Y coordinate slats 710 and X coordinate slats 720A and 720B. In the configuration shown in FIG. 34B, slat 710 is axially translated to an extent that appendages 715 thereof protrude into the respective recesses in slats 720A and 720B. The recesses of transverse X coordinate slat 720A are however axially staggered relative to the recesses of transverse X coordinate slat 720B, so that appendage 715 of Y coordinate slats 710 is bent by a shoulder 725 of the recessed slat 720A, while the consecutive appendage is left intact. This pressing and bending of appendages 715 actuates locking hook 620 thereby opening of the bin's lid. Alternatively, if only Y coordinate slats 710 or only X coordinate slat 720 is translated along its main axis, appendages 715 of Y coordinate slats 710 will not be affected by such movement and the bin will not be opened.

Figure 35B:
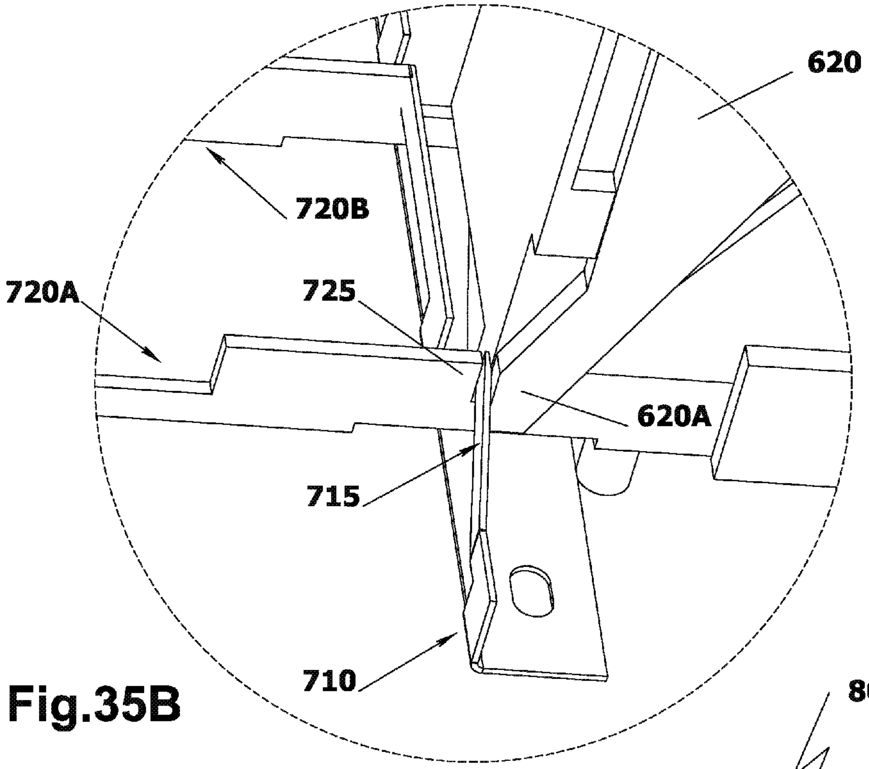
FIG. 35B shows an enlarged view of area designated "35B" in FIG. 35A.
Figure 35A:
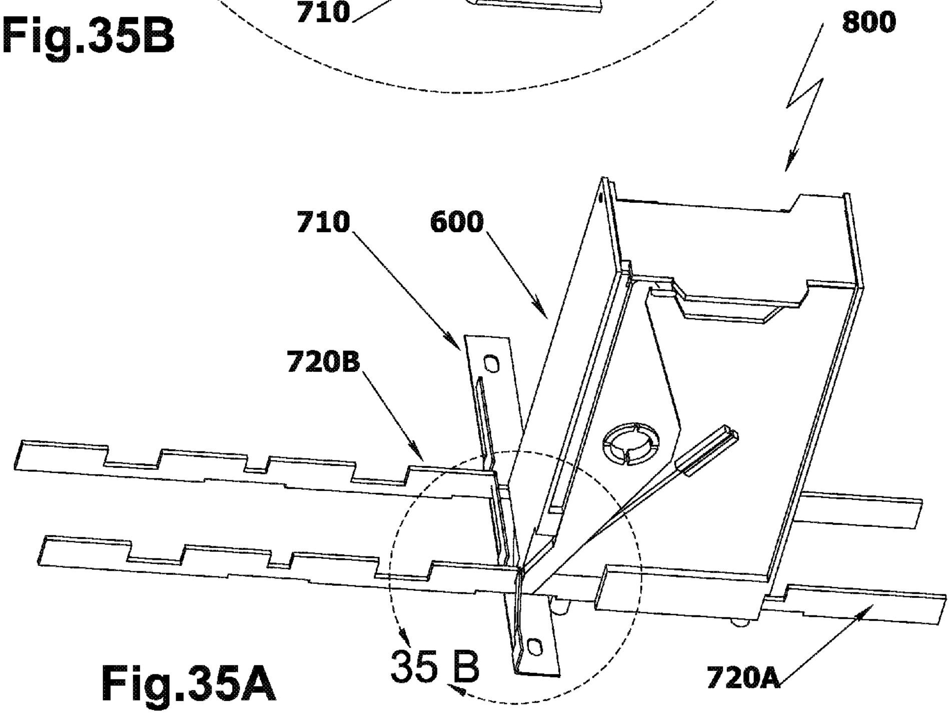
FIG. 35A shows the transverse and perpendicular slats of FIGS. 34*a* and 34B with the bin assembly mounted thereon.

FIGS. 35A and 35B respectively show a bin and slat assembly and enlarged view of a portion of FIG. 35A including Y coordinate slats 710; X coordinate slats 720A and 720B; and bin assembly 600 mounted thereon. As can be seen in FIG. 35B, bin assembly 600 is configured relative to slats 710 and 720A and 720B in such a manner that actuating portion 620A of locking hook 620 can be engaged by appendage 715 of Y coordinate slats 710, when appendage 715 is being pressed by slat 720A. Each bin assembly location is defined by its respective X and Y coordinates on the grid formed by Y coordinate slats 710 and transverse X coordinate slats 720 running transversely across the drawer and Y coordinate slats 710 run with the direction perpendicular to the X direction, i.e. in the direction of the inward and outward movement of the drawer.

When actuating portion 620A of locking hook 620 is pushed by the appendage 715 of Y coordinate slat 710, which is pressed by shoulder 725 of recessed transverse slat 720A, locking hook 620 is rotated and the locking portion thereof is urged away from the pin 619 of the lid 615 of bin 610; and thus locking hook 620 and the pin disengage, and as result the biasing spring urges the lid open.

The mutual configurational relationships between the crossing X and Y coordinate slats 710 and 720 allows selective bending a particular appendage 715 of a specific Y slat that is possible only after axial translation of this Y slat, whereby its appendage has been introduced into the respective recess of an X slat, and a further following axial translation of the X slat, whereby the appendage of the Y slat is pressed and consequently bent by the respective shoulder 725 of the X slat.

FIGS. 36-43 relate to another exemplary drawer assembly including a bin assembly having a bin opening mechanism of the cabinet of the dispensing system.

Figure 36:
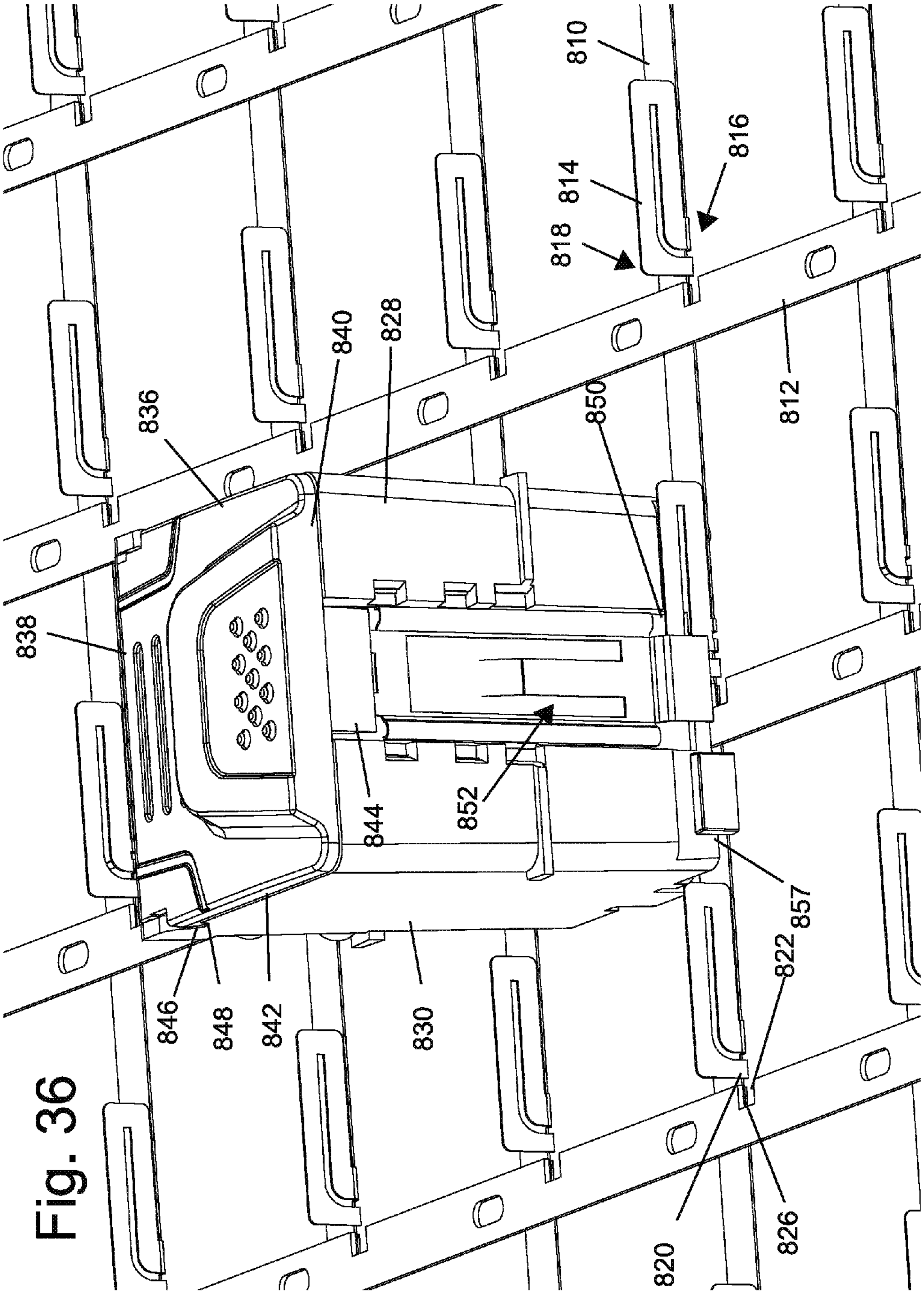
FIGS. 36-43 relate to another exemplary embodiment of the present invention.
Figure 37:
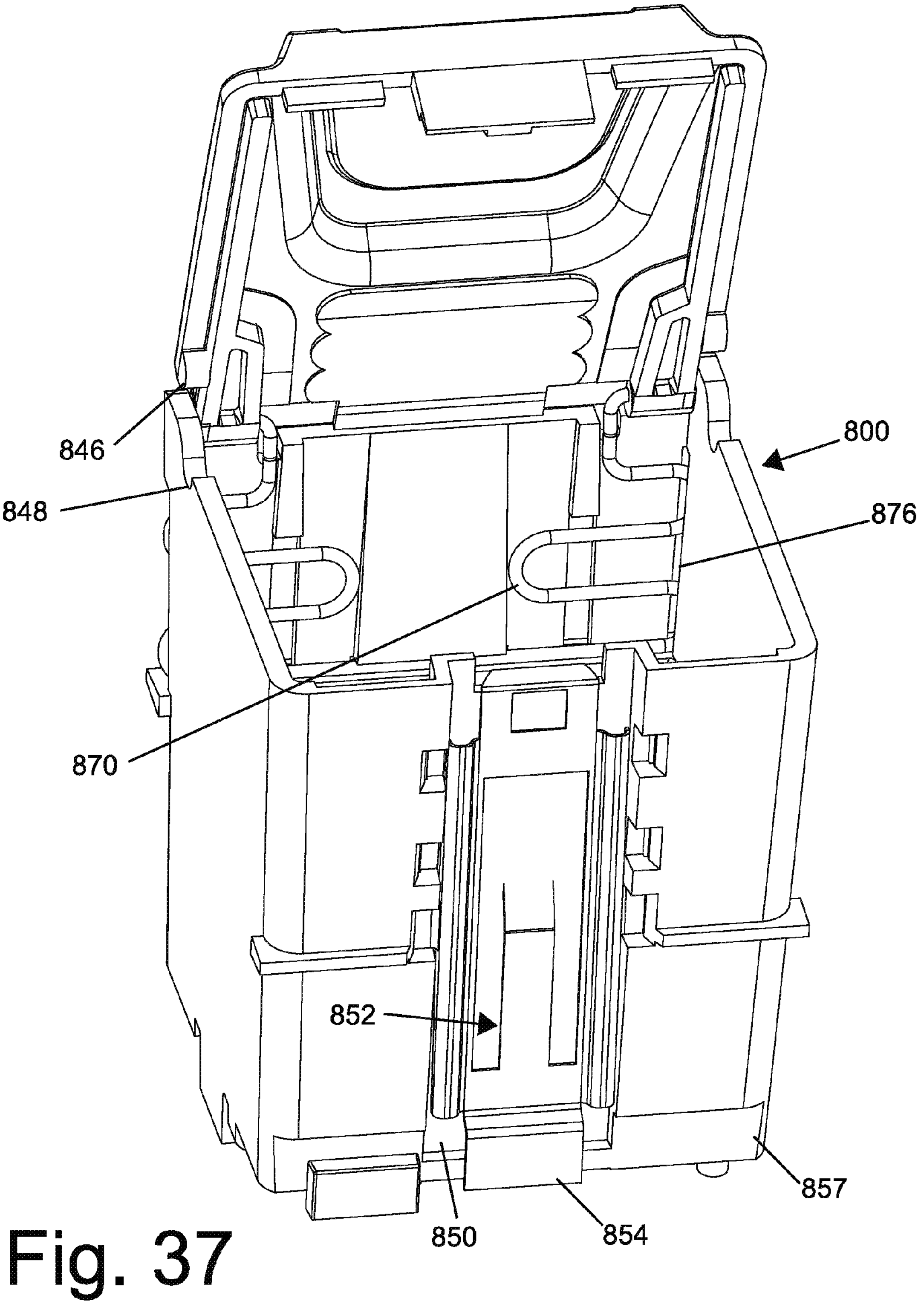
Figure 43:
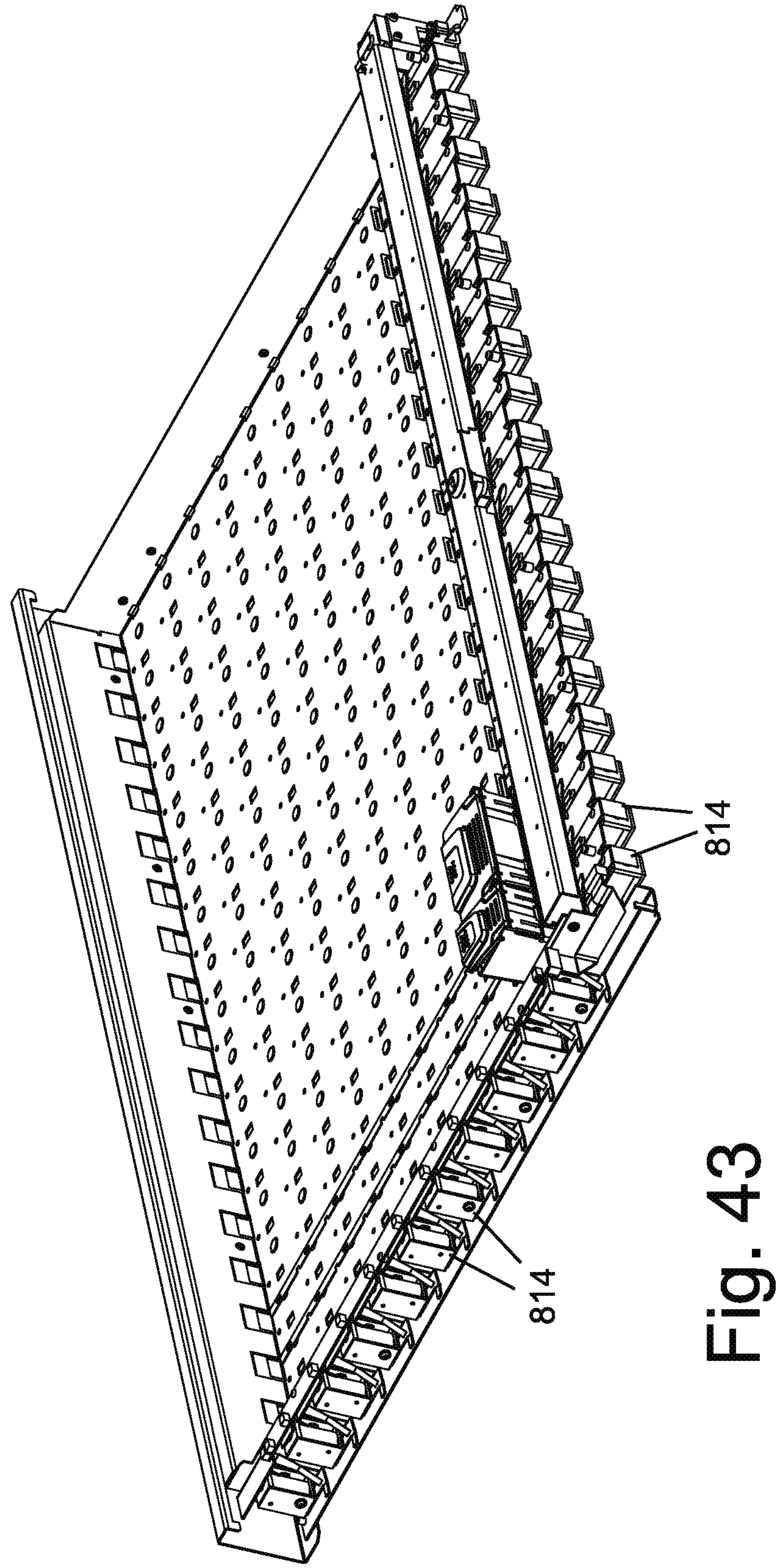

Attention is first drawn to bin opening slats, row or X slats 810 and column or Y slats 812 that lay flat in a crisscross pattern along the bottom of drawer 24, for affecting opening of bins 800 (FIGS. 36-37 and 43). Each X slat 810 has a series of equidistantly spaced apart and upwardly extending flexible appendages 814, typically but not necessarily perpendicular to the slats. Appendages 814 have a proximal end 816 attached to slat 810 and a distal end 818 with a downwardly facing projection 820. Y slats 812 have a series of recesses or notches 822. Appendages 814 of slats 810 and notches 822 of slats 812 are arranged so the appendages and notches correspond, i.e. the appendages face the notches (FIG. 36) and the appendages can enter the notches (FIG. 37) when the dispenser system is operated.

Referring to FIG. 43, each of the slats 810 and 812 is axially movable by actuators, for example electromechanical actuators such as solenoids 824. To open a particular bin 800, the user operates the DACS via screen display 32 to indicate which bin should be opened, or more likely which item is desired, as the DACS is preferably programmed and the bins appropriated loaded with items so the specific item(s) in each bin or group of bins is known by the system. As a result, the appropriate solenoid 824 is activated to axially move the corresponding X slat 810 of the row of the desired bin so that projection 820 of appendages 814 of that corresponding X slat enter notches 822 of Y slats 812. The Y slat 812 of the column of the desired bin 810 is then moved forward so that notch 822 (in particular a shoulder 826 thereof) bends the flexible appendage 814 adjacent the bin 800 to be opened (FIG. 37).

To further understand how the bin 800 is opened by the afore-described slats 810 and 812, the bin will now be described, with reference to FIGS. 36-40 mainly. Each bin 800 is generally cube-shaped having a front wall 828; side walls 830; a rear wall 832; a bottom 834; and a lid 836. Lid 836 has a rear edge 838; a front edge 840 and side edges 842. Rear edge 838 is pivotally (operably, i.e. not necessarily directly) attached to rear wall 832 of bin 800. Descending from front edge 840 of lid 836 is a tab 844 having an inwardly facing lip (not visible). Lid 836 includes a pair of rounded lid fulcrum projections 846 on either side edge 842 of the lid, near but somewhat distanced from its rear edge 838, for example as shown.

Each lid fulcrum projection 846 is arranged opposite a corresponding rounded recess 848 in the upper edge of each side wall 830 of bin 800. However, typically, recesses 848 are slightly shallower than the height of projections 846 so that there is a slight bend or flex in lid 836 when the lid is closed in order to help the lid pop open when the lid is released; i.e. producing a fulcrum resulting in a seesaw-like effect.

Front wall 828 of bin 800 has a depression 850 in which there is disposed a lid lock and release element 852. Lid lock and release element 852 is shown in an isolated view in FIG. 41. Lid lock and release element 852 is for example of a generally frame-like shape and comprises a frame 854 from which an appendage engagement tab 856 descends. Tab 856 is typically slightly bent, for example as shown, to allow appendage 814 to slide behind the tab when one of bins 800 is to be opened. Alternatively or in addition, a lower portion of front wall 828 can have a recess 857 to provide space for appendage 814 to advance behind tab 854 when one of bins 800 is to be opened. Lid lock and release element 852 further includes a bin attachment portion such as a pair of attachment projections 858 to attach the element 852 to bin 800, for example at slits (not seen) in the sides of depression 850. Extending upward at the top of frame 854 is a bin lid lock and release catch 860 with an aperture 862 designed to catch on the inwardly facing lip of tab 844 of lid 836 to secure the lid in a closed position. Catch 860 typically also includes an inwardly projecting flap 864 to help the catch slide under tab 844 of lid 836. Element 852 also has a biasing member, for example a leaf spring 866, adapted to bias catch 860 outward from bin 800 and at the same time to bias appendage engagement tab 856 inward. This biasing adaptation can be achieved for example via a bend 867 in leaf spring 866.

Figure 38:
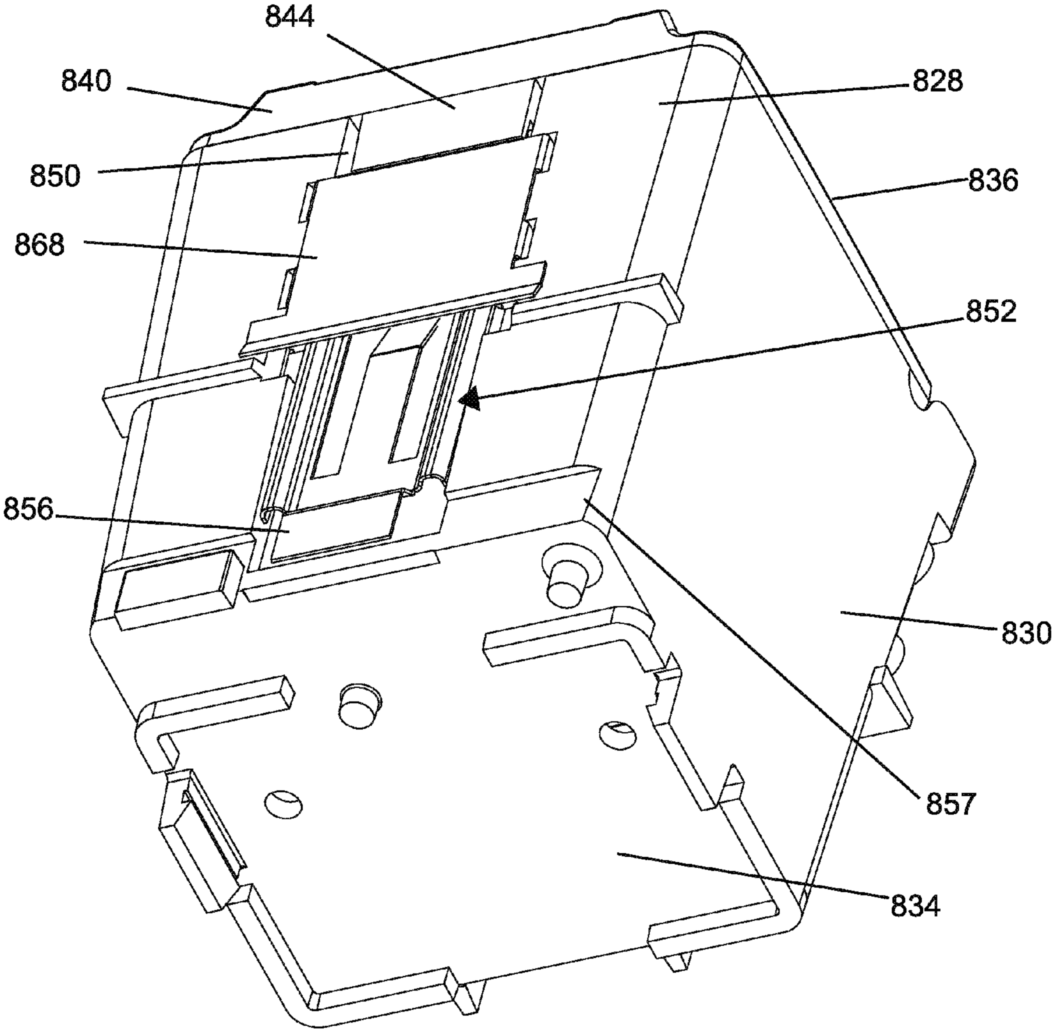
Figure 39:
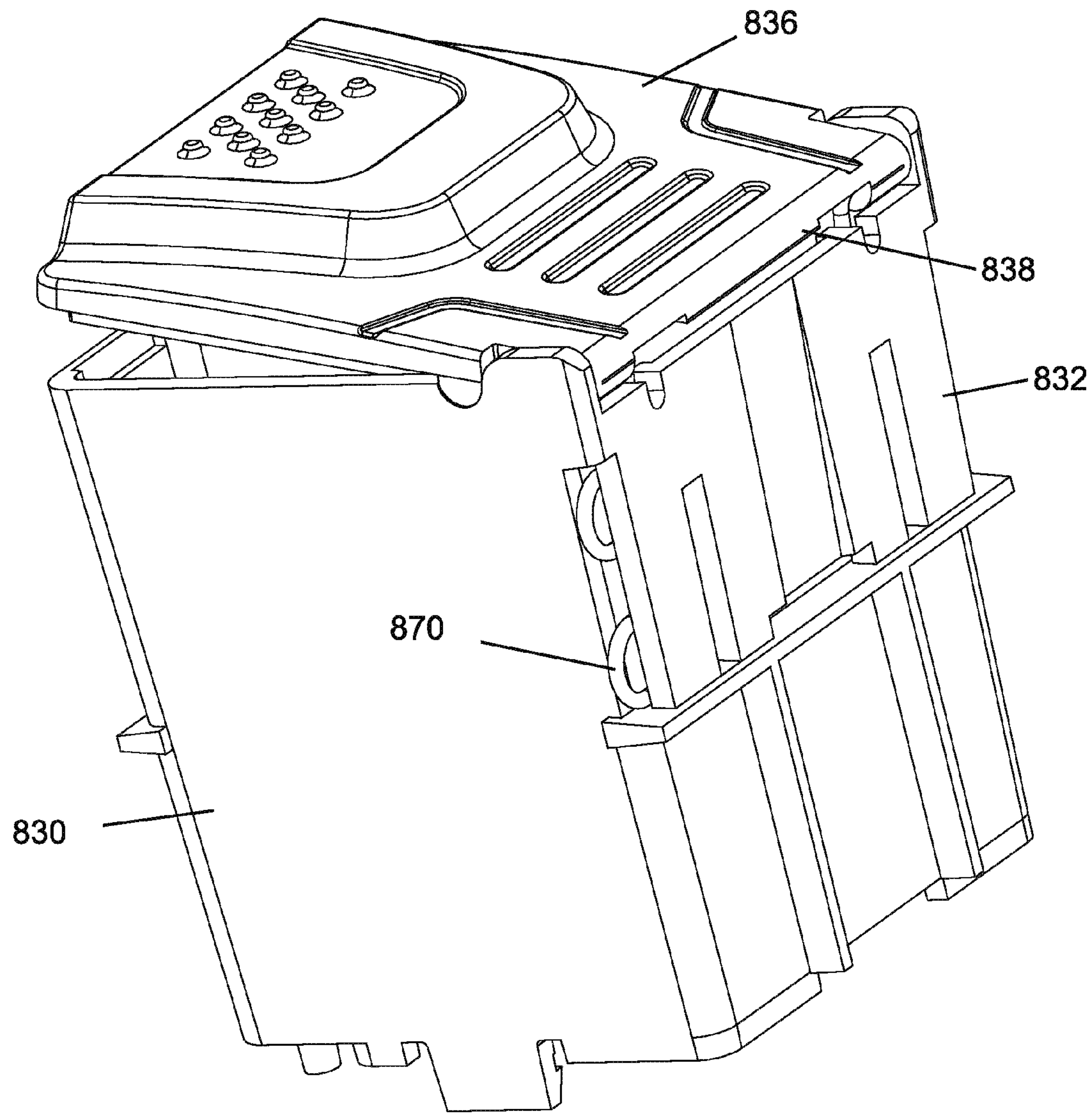
Figure 40:
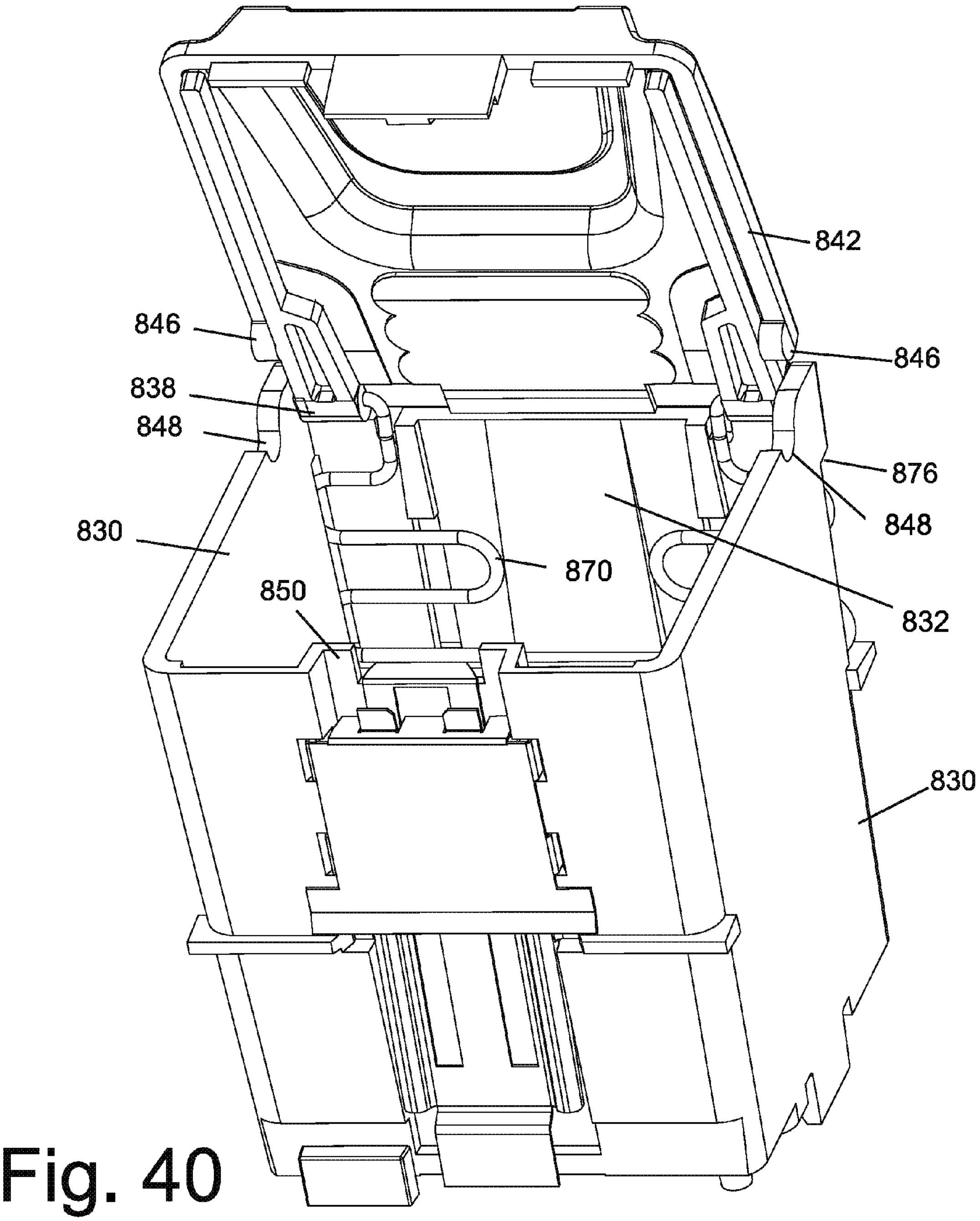

Referring to FIG. 38, the bin assembly typically includes a tamper prevention cover 868 which preferably abuts or essentially abuts the lower edge of tab 844 to prevent inadvertent or intentional inappropriate bypass of the system by preventing access to bin lid lock and release catch 860. Although typically bins 800 are closely adjacent each other which makes tampering difficult, the bins can be used to house expensive and/or sensitive items (e.g. medicine) and it may thus be very important to provide a system that is difficult to inappropriately bypass.

Figure 42:
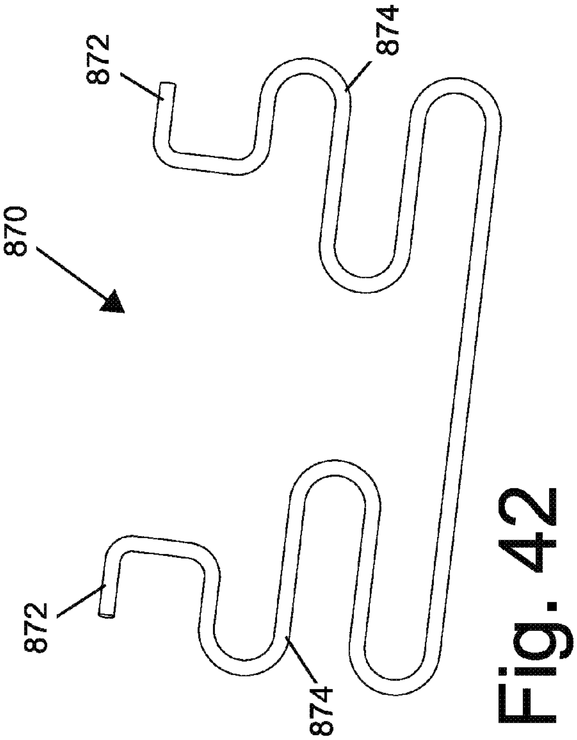
Figure 41:
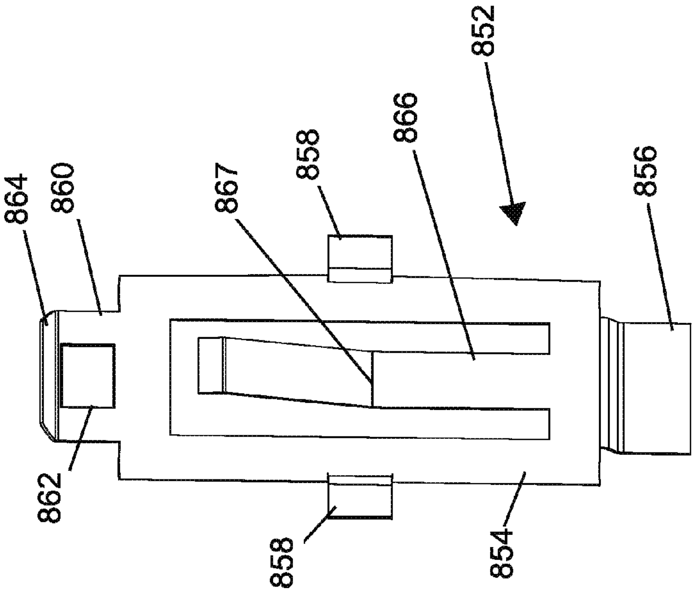

FIG. 42 shows an exemplary pivot and biasing element such as pivot spring 870 to help lid 836 pop up upon being released by lid lock and release element 852. Pivot spring 870 also provides a pivot axis for lid 836, although the lid could comprise a commonly known mechanism of side pins fitting into corresponding recesses in the upper rear corners of side wall 830, for example. However, pivot spring 870 provides this pivot function, via pivot portions 872 as well as biasing rear edge 838 of lid 836 downward to improve the seesaw/fulcrum effect noted above with regard to rounded lid fulcrum projections 846 and corresponding rounded recesses 848. This biasing is provided by for example by serpentine portions 874 of pivot spring 870 which are biased to pull downward on rear edge 838 of lid 836. Pivot spring 870 can be held in slits 876 of side walls 830.

FIG. 38 shows the underside of bin 800 including one or more a spacing members 878 to provide space for slats 810 and 812 to slide under the bin. Also seen is a bin-to-drawer bottom attachment mechanism, for example via snap catches 880 snapping into drawer bottom apertures 882.

As mentioned, to open one of the bins 800, the appropriate solenoid 814 is activated to axially move the corresponding X slat 810 of the row of the desired bin so that projection 820 of appendages 814 of that corresponding X slat enter notches 822 of Y slats 812. The Y slat 812 of the column of the desired bin 810 is then moved forward so that notch 822 (in particular shoulder 826 thereof) bends the flexible appendage 814 adjacent the bin 800 to be opened (FIG. 37).

Appendage 814 thus presses appendage engagement tab 856 outward, away from bin 800, whereby lid lock and release element 852 seesaws on its leaf spring 866 so that bin lid lock and release catch 860 is moved inward toward the bin. This inward movement of catch 860 frees tab 844 of lid 836 whereby the lid pops open, aided by pivot spring 870 pulling down on rear edge 838 of the lid and by lid fulcrum projection 846.

It should be noted that due to the design of slats 810 and 812 and bins 800, there is very little space "wasted" in drawers 32 or the bins. In particular, there is no need for bin or drawer dividers. Row or X slats 810 and column or Y slats 812 can be made very thin, and so can appendages 814. As with embodiments already noted, the design of the present embodiment allows the use of different sized bins 800 that can abut each other on all sides, which allows the possibility to store and dispense items of different sizes.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A cabinet for storing and dispensing an inventory of items, the cabinet comprising:
at least one drawer having a drawer bottom;
a plurality of criss-crossing row slats and column slats arranged along the bottom of the at least one drawer, the row slats having a plurality of flexible appendages protruding upward there-from and the column slats having a plurality of notches corresponding to and for engaging the flexible appendages of the row slats;
a plurality of slat movement actuators for axially moving respective row and column slats;
a plurality of bins arranged corresponding to row slats and column slats in the at least one drawer, each bin having a lid pivotally connected thereto; and
a lid lock and release element associated with each bin, the lid lock and release element adapted to hold the lid closed until actuated by one or more of the flexible appendages of the row slats,
whereby bins of various sizes can be arranged abutting each other on all sides thereof in the drawer; and the bins are automatically opened via actuation of the lid lock and release element, which is actuated by actuating the row slat(s) and column slat(s) related to the bins to be accessed.

2. The cabinet of claim 1, wherein the lid comprises a lid fulcrum projection to help the lid pop open when released by the lid lock and release element.

3. The cabinet of claim 1, wherein the lid is pivotally held to the bin by a pivot and biasing element that both provides for pivoting and biasing of the lid to help the lid pop up upon being released by lid lock and release element.

4. The cabinet of claim 1, wherein the row and column slats run under the bins.

5. The cabinet of claim 1, wherein lid lock and release element comprises a leaf spring upon which the element can seesaw when actuated by one of the plurality of flexible appendages of the row slats.

6. The cabinet of claim 1, wherein bin further comprises a tamper prevention cover for preventing tampering with the lid lock and release element.

7. The cabinet of claim 1, wherein the row and column slats lay flat along the bottom of the drawer.

8. The cabinet of claim 1, wherein the slat movement actuators comprise solenoids.

9. A drawer assembly for a drawer of an item dispensing cabinet, the drawer assembly comprising:

a plurality of criss-crossing row slats and column slats arranged along the bottom of the drawer, the row slats having a plurality of flexible appendages protruding upward there-from and the column slats having a plurality of notches corresponding to and for engaging the flexible appendages of the row slats;

a plurality of slat movement actuators for axially moving respective row and column slats;

a plurality of bins arranged corresponding to row slats and column slats in the drawer, each bin having a lid pivotally connected thereto; and a lid lock and release element associated with each bin, the lid lock and release element adapted to hold the lid closed until actuated by one or more of the flexible appendages of the row slats, whereby bins of various sizes can be arranged abutting each other in the drawer and the bins are automatically opened via actuation of the lid lock and release element, which is actuated by actuating the row slat(s) and column slat(s) related to the bins to be accessed.

10. The assembly of claim 9, wherein the lid comprises a lid fulcrum projection to help the lid pop open when released by the lid lock and release element.

11. The assembly of claim 9, wherein the lid is pivotally held to the bin by a pivot and biasing element that both provides for pivoting and biasing of the lid to help the lid pop up upon being released by lid lock and release element.

12. The assembly of claim 9, wherein the row and column slats run under the bins.

13. The assembly of claim 9, wherein lid lock and release element comprises a leaf spring upon which the element can seesaw when actuated by one of the plurality of flexible appendages of the row slats.

14. The assembly of claim 9, wherein bin further comprises a tamper prevention cover for preventing tampering with the lid lock and release element.

15. The assembly of claim 9, wherein the row and column slats lay flat along the bottom of the drawer.

16. The assembly of claim 9, wherein the slat movement actuators comprise solenoids.

* * * * *